(12) United States Patent
Jain et al.

(10) Patent No.: US 9,973,392 B2
(45) Date of Patent: May 15, 2018

(54) HIERARCHICAL NETWORK ANALYSIS SERVICE

(71) Applicant: Microsoft Technology Licensing, LLC, Redmond, WA (US)

(72) Inventors: Navendu Jain, Seattle, WA (US); Rahul Potharaju, West Layfette, IN (US)

(73) Assignee: Microsoft Technology Licensing, LLC, Redmond, WA (US)

(*) Notice: Subject to any disclaimer, the term of this patent is extended or adjusted under 35 U.S.C. 154(b) by 289 days.

(21) Appl. No.: 14/057,757

(22) Filed: Oct. 18, 2013

(65) Prior Publication Data

US 2015/0113118 A1 Apr. 23, 2015

(51) Int. Cl.
*G06F 15/173* (2006.01)
*H04L 12/24* (2006.01)
*H04L 12/26* (2006.01)

(52) U.S. Cl.
CPC ........... *H04L 41/145* (2013.01); *H04L 41/06* (2013.01); *H04L 43/028* (2013.01); *H04L 43/04* (2013.01); *H04L 43/045* (2013.01); *H04L 43/062* (2013.01); *H04L 43/065* (2013.01); *H04L 43/0823* (2013.01); *H04L 43/0876* (2013.01)

(58) Field of Classification Search
CPC ......... H04L 41/04; H04L 41/08; H04L 41/12; H04L 41/14; H04L 41/22; H04L 41/145; H04L 43/00; H04L 43/02; H04L 43/028; H04L 43/04; H04L 43/045; H04L 43/06; H04L 43/062; H04L 43/065; H04L 43/08; H04L 43/0876; H04L 43/10; H04L 43/18; H04L 12/26; H04L 12/2602; H04L 12/2605; H04L 12/2615; H04L 12/2618; H04L 12/2621; H04L 12/2623; H04L 12/2626; H04L 12/2628; H04L 12/2634; H04L 12/2668; H04L 12/2678; H04L 12/2686; H04L 12/2694; H04W 24/00; H04W 24/08
USPC ......... 709/217, 219, 223, 224; 370/241, 254
See application file for complete search history.

(56) References Cited

U.S. PATENT DOCUMENTS

| 7,315,985 B1 | 1/2008 | Gauvin et al. |
| 7,930,752 B2 | 4/2011 | Hertzog et al. |
| 8,943,154 B1* | 1/2015 | Bodell .................... H04L 41/12 709/206 |

(Continued)

OTHER PUBLICATIONS

Becker, et al., "Visualizing Network Data", In IEEE Transactions on Visualization and Computer Graphics, vol. 1, Issue 1, Mar. 1995, 39 pages.

(Continued)

*Primary Examiner* — Liangche A Wang
*Assistant Examiner* — Johnny Aguiar
(74) *Attorney, Agent, or Firm* — Arent Fox LLP

(57) ABSTRACT

A hierarchical network analytics system operated by a computing device or system is described. In some example techniques, the analytics system may determine results of a plurality of first level analyses each based at least in part on results of a respective plurality of data queries that return respective subsets of a plurality of types of network data. The analytics system may determine a result of a second level analysis based at least in part on results of the plurality of first level analyses.

19 Claims, 15 Drawing Sheets

(56) References Cited

U.S. PATENT DOCUMENTS

| | | | |
|---|---|---|---|
| 2004/0024859 A1* | 2/2004 | Bloch | H04L 43/0876 709/223 |
| 2005/0193000 A1 | 9/2005 | Linke | |
| 2009/0119673 A1* | 5/2009 | Bubba | G06F 9/50 718/104 |
| 2009/0327903 A1 | 12/2009 | Smith et al. | |
| 2010/0027432 A1* | 2/2010 | Gopalan | H04L 41/142 370/252 |
| 2010/0110932 A1* | 5/2010 | Doran | H04L 41/22 370/254 |
| 2011/0087767 A1* | 4/2011 | Sonkin | G06F 9/44505 709/224 |
| 2013/0007262 A1* | 1/2013 | Akatoki | H04L 43/04 709/224 |
| 2013/0151700 A1* | 6/2013 | Liu | H04W 24/08 709/224 |
| 2014/0068338 A1* | 3/2014 | Kamble | H04L 41/142 714/37 |
| 2014/0136690 A1* | 5/2014 | Jain | H04L 41/0826 709/224 |
| 2014/0258509 A1* | 9/2014 | Raghuraman | H04L 43/0876 709/224 |

OTHER PUBLICATIONS

Bethel, et al., "Accelerating Network Traffic Analytics Using Query-Driven Visualization", In IEEE Symposium on Visual Analytics Science and Technology, Oct. 31, 2006, 8 pages.

Callahan, et al., "VisTrails: Visualization meets Data Management", In Proceedings of the ACM SIGMOD International Conference on Management of Data, Jun. 27, 2006, 3 pages.

"Monolith Real Time Dashboards", In Monolith Data Sheet, Retrieved on: May 20, 2013, 3 pages.

"Shadow RTD—Real Time Dashboard", Published on: Oct. 4, 2010, Retrieved from http://www.telecost.com/dashboard.htm, 2 pages.

"U2Net: Visualized Network Management", Published on: May 20, 2012, retrieved from: http://www.huawei.com/ilink/en/solutions/broader-smarter/morematerial-b/HW_103297, 3 pages.

* cited by examiner

HIERARCHICAL NETWORK ANALYSIS SERVICE

BACKGROUND

The continued proliferation of distributed computing platforms and complex networks in general has led to a need for systems and methods for managing these platforms. For example, understanding network topology and its dynamic state may be challenging, especially in large networks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A hierarchical network analytics system operated by a computing device or system is described herein. In some example techniques, the analytics system may determine results of a plurality of first level analyses, each based at least in part on results of a respective plurality of data queries that return respective subsets of a plurality of types of network data. The analytics system may determine a result of a second level analysis based at least in part on results of the plurality of first level analyses.

BRIEF DESCRIPTION OF THE DRAWINGS

The Detailed Description is described with reference to the accompanying figures. The use of the same reference numbers in different figures indicates similar or identical items.

DETAIL DESCRIPTION

Overview

This disclosure includes techniques and arrangements for conducting hierarchical network analytics and for presenting the result of the hierarchical network analytics. In some implementations, the techniques and arrangements may provide functionality to collect information from network devices. The techniques and arrangements may also provide functionality for the performance of hierarchical network analytics. Additionally, the techniques and arrangements may also provide functionality for the presentation of the collected information and the results of the hierarchical network analytics.

Further, some implementations may provide for the hierarchical network analytics to be performed for filtered data sets. For example, the filters may operate based on such criteria as location, time, functionality, and/or events to leverage the hierarchical nature of the network, such as by topology level, datacenter, and/or property.

Although the discussion herein may describe some implementations in which a user device performs the functions of the hierarchical network analytics system, other implementations are not so limited, and the techniques and methods discussed herein may be performed by other computing devices such as servers, network devices, etc.

The hierarchical network analytics system and techniques described herein may be implemented at various levels in the software and hardware of computing systems. Such levels include the Operating System (OS) level, such as in the OS with or without application support, the application level, either separate from the OS (i.e., stand-alone) or as a plug-in to the OS or a plug-in to another application and so forth.

It should also be noted that, for readability, interactions between modules may be described herein as signals or commands, but such interactions may be implemented in various ways, such as by function calls between various program modules.

Figure 1:
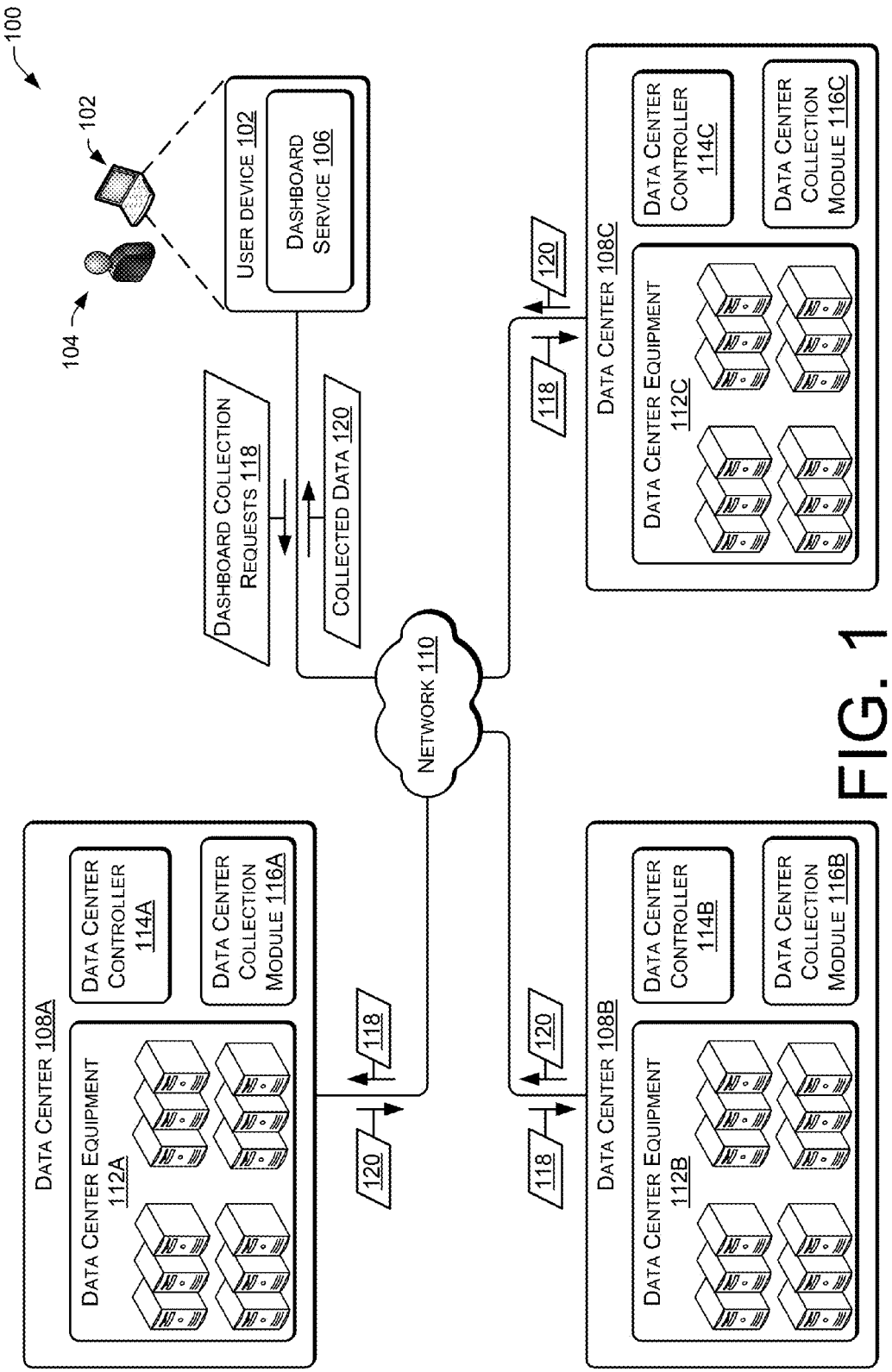
FIG. 1 is a schematic diagram of an illustrative computing architecture.

FIG. 1 is a logic diagram of an illustrative computing architecture 100. The computing architecture 100 may include a user device 102 of a user 104 including a dashboard service 106 which is capable of communicating with one or more data centers 108A, 108B and 108C via one or more network(s) 110 (e.g., public network(s) such as the Internet or private network(s) such as a local area network(s) (LAN)). As shown in FIG. 1, each data center 108A-108C may include data center equipment 112A-112C, one or more data center controller(s) 114A-114C, and one or more data center collection module(s) 116A-116C. The data center equipment 112A-112C, data center controllers 114A-114C, and the data center collection module(s) 116A-116C may include one or more machines (e.g., one or more server computer systems, routers, gateways, etc.) that have processing and storage capabilities to provide the functionality of data centers in general (e.g., distributed computing over a network and running an application on many connected computers at the same time) in addition to the functionality discussed below. Of course, while various implementations are shown and discussed herein as communicating with one or more data centers or in relation to data centers in general, implementations are not so limited as the techniques and arrangements in accordance with this disclosure may be utilized in conjunction with any type of network architecture. Moreover, while one user 104 and one user device 102 are shown in FIG. 1, this is not a limitation and implementations may include one or more users and user devices.

Viewing the operation of the system 100 at this depth, the user 104 may utilize user device 102 to cause the dashboard service 106 to initiate or make dashboard collection requests 118 to the data centers 108A-108C, such as to the data center controllers 114A-114C of the data centers 108A-108C, to provide collected data 120 from the respective data center 108A-108C. The data center controllers 114A-114C may act to control the data center equipment 112A-112C to provide information about the operation of the data center equipment 112A-112C to the data center collection modules 116A-116C of the respective data center 108A-108C. In turn, the data center collection modules 116A-116C receive the information from the data center equipment 112A-112C and, for example, log the received information. Upon receiving the dashboard collection requests 118, the data center controllers 114A-114C may operate to publish the information collected by the data center collection modules 116A-116C to the dashboard service 106 as collected data 120. Of course, this is but one example environment in which the techniques and arrangements may operate and is provided to allow for an example context for the explanation to follow. The techniques and arrangements are not limited to this example environment. For example, the system set forth above is discussed as a "pull" type system in which the dashboard service 106 issues dashboard collection requests 118 to "pull" the collected data 120 from the data centers 108. In other examples, the system may operate as a "push" type system in which the data center controllers 114A-114C operate to publish the collected data 120 without a request from the dashboard service 106 (e.g., periodically or upon collection of a predetermined amount of collected data 120).

Additionally, though the data center controllers 114A-114C and the data center collection module(s) 116A-116C are illustrated in the logic diagram of FIG. 1 as separate from the data center equipment 112A-112C, implementations are not so limited and may include implementations in which the data center controllers 114A-114C and the data center collection module(s) 116A-116C are implemented by the data center equipment 112A-112C, either in a distributed or non-distributed fashion, and implementations in which the data center controllers 114A-114C and the data center collection module(s) 116A-116C are implemented separately from the data center equipment 112A-112C. Additional discussion of the functionality of the dashboard service 106, data center equipment 112A-112C, data center controllers 114A-114C, and data center collection modules 116A-116C is provided with reference to FIGS. 2-8.

The above discussion provides many details and examples related to FIG. 1 and the disclosed systems and techniques in general. However, the above discussion is not limiting and many variations are possible and will be appreciated in view of this disclosure. For example, while the dashboard service 106 is illustrated in FIG. 1 as being implemented by the user device 102, implementations of the disclosed systems and techniques are not so limited. For example, in some implementations, the dashboard service 106 may be implemented by dedicated equipment or on data center equipment 112A-112C, in a distributed or non-distributed manner.

Figure 2:
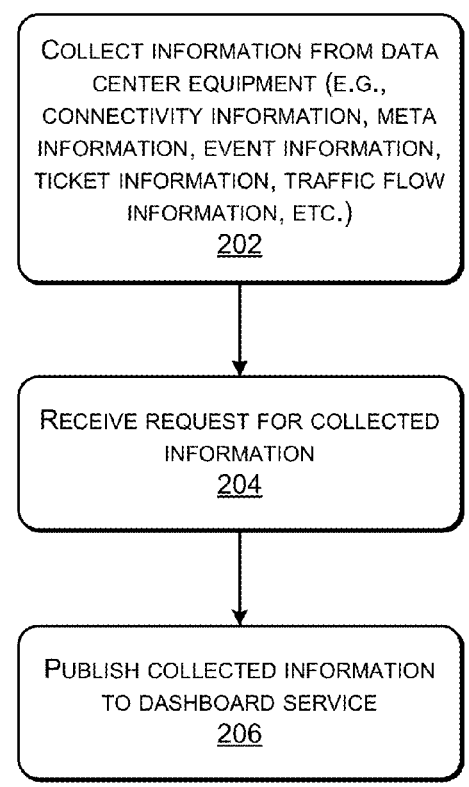
FIG. 2 illustrates an example process flow according to some implementations by which a data center controller may collect information from data center equipment.

FIG. 2 illustrates an example process flow 200 according to some implementations. In particular, the process flow 200 illustrates an example process by which a data center controller may collect information from data center equipment 112. In the flow diagram of FIG. 2, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process flow 200 is described with reference to the system 100, described above, although other models, frameworks, systems and environments may implement the illustrated process. Other processes described throughout this disclosure (e.g., those shown in FIGS. 4, 7-8, 10-11 and 14), in addition to process 200, shall also be interpreted accordingly.

In some implementations, prior to conducting process flow 200, the data center controller 114 may be instructed to begin the collection of network information from the data center equipment 112. In some implementations, the collection process may be performed on demand rather than on an ongoing basis.

At 202, the data center controller 114 collects information from the data center equipment 112 and stores the collected information in the data center collection module 116. For example, in some implementations, the collected information may include connectivity information, meta information, event information, trouble ticket information, traffic flow information, configuration data, maintenance data, planned changes data, routing data, performance counters data, security alerts and so on. The information may be collected utilizing a variety of techniques. For example, event information may be created based on syslog data and Simple Network Management Protocol (SNMP) management information base (MIB) data, trouble ticket information may be collected using Network Operations Center (NOC) Internal Integrated Trouble Ticket System (e.g., RFC 1297) data, and traffic flow information may be collected using Cricket traffic data or another traffic monitoring system such as but not limited to HP OpenView and IBM Tivoli. The meta information data may also be collected in a variety of ways. For example, the data center controllers may include functionality to parse MSNCONF webpages and extract rules by which the incoming device is tagged. The meta information may then be populated using the rules extracted from the MSNCONF webpages. In some implementations, a heuristic tagger may be used that tags a device name even if a rule is missing from the MSNCONF webpages the if heuristic tagger finds meta information for "other" similar devices (i.e., meta information from other similar devices may be used to populate the meta information of a device if the MSNCONF webpage is missing a rule). Of course, implementations are not limited to utilizing MSNCONF and may instead use other network configuration systems in a similar fashion (e.g. MSNCONF as a data storage that stores configuration and meta-data of network devices).

At block 204, the data center controller 114 receives a request for the collected information (e.g., from the dashboard service 106). At block 206, the data center controller 114 publishes the collected information to the dashboard service 106 via the network 110. In some implementations, the data center controller 114 may return to block 202 and continue collecting network information that may subsequently be requested.

Figure 3:
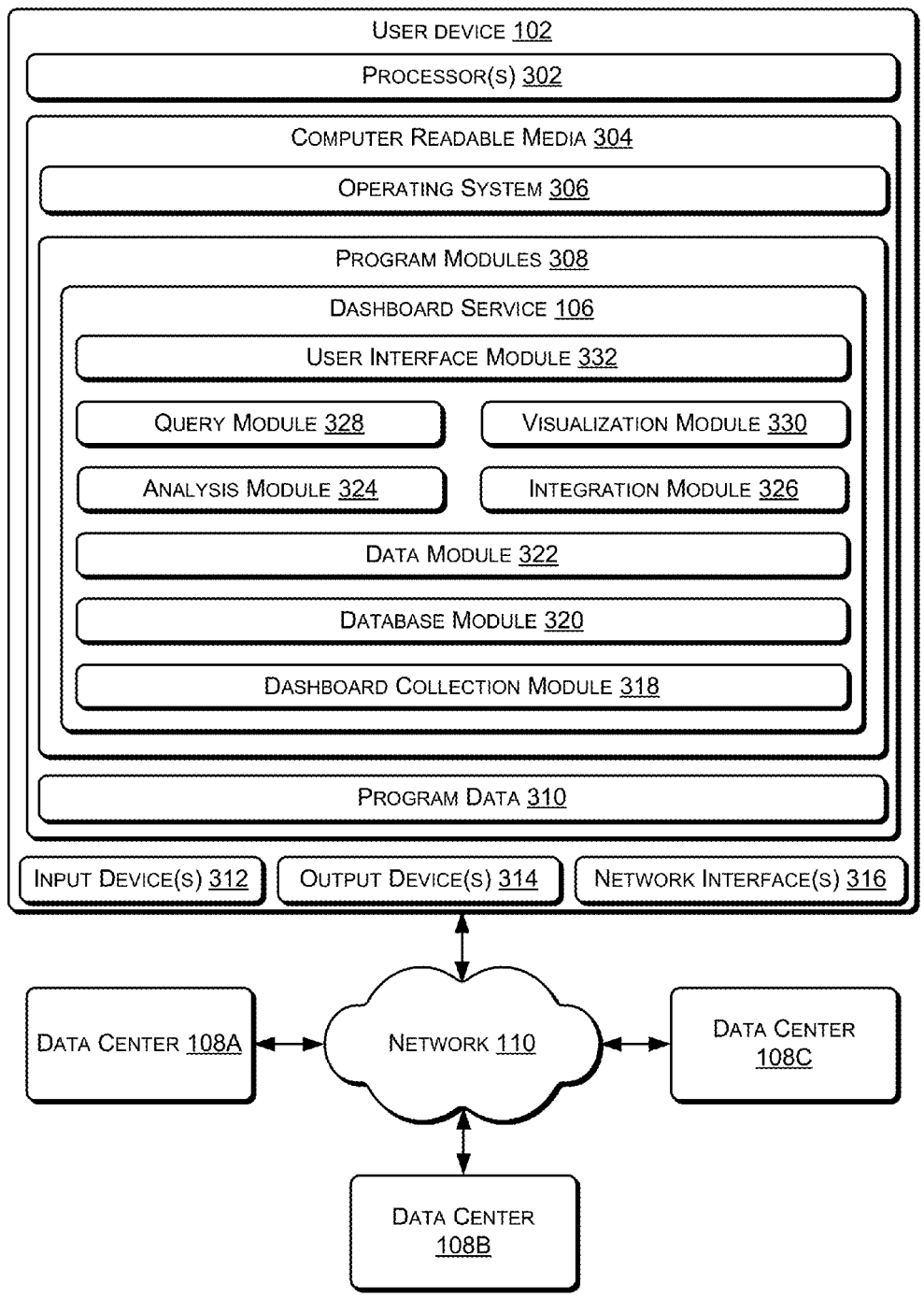
FIG. 3 is a block diagram of an illustrative user device.

FIG. 3 is a block diagram 300 illustrating an example configuration of the user device 102 of FIG. 1. The user device 102 includes one or more processors 302. The processor(s) 302 can be implemented as one or more microprocessors, microcomputers, microcontrollers, digital signal processors, central processing units, state machines, logic circuitries, and/or any devices that manipulate signals based on operational instructions. As one example, the processor(s) 302 may be one or more hardware processors and/or logic circuits of any suitable type specifically programmed or configured to execute the algorithms and processes described herein. Among other capabilities, the processor 302 can be configured to fetch and execute computer-readable instructions stored in the computer-readable media 304.

The user device 102 also includes computer-readable media 304. The computer-readable media 304 may store information which provides an operating system component 306, various program modules 308 such as the dashboard service 106, program data 310, and/or other components. In one example, the user device 102 performs functions by using the processor(s) 302 to execute instructions provided by the computer-readable media 304.

As used herein, "computer-readable media" includes, at least, two types of computer-readable media, namely computer storage media and communications media.

As used herein, computer storage media or computer-readable storage media may correspond to any combination of volatile and/or non-volatile storage mechanisms. Depending on the configuration of the user device 102, the computer-readable media 304 may be an example of a computer storage media for storing instructions which are executed by the processor 302 to perform the various functions described herein. For example, the computer-readable media 304 may generally include both volatile memory and non-volatile memory (e.g., RAM, ROM, or the like). Further, the computer-readable media 304 may generally include hard disk drives, solid-state drives, removable media, including external and removable drives, memory cards, flash memory, floppy disks, optical disks (e.g., CD, DVD), a storage array, a network attached storage, a storage area network, or the like. The computer-readable media 304 may be referred to as memory or computer storage media herein, and may be a media capable of storing computer-readable, processor-executable program instructions as computer program code that can be executed by the processor 302 as a particular machine configured for carrying out the operations and functions described in the implementations herein.

In contrast, communication media embody computer readable instructions, data structures, program modules, or other data in a modulated data signal, such as a carrier wave, or other transmission mechanism. As defined herein, computer storage media does not include communication media.

The user device 102 may also include one or more input devices 312 (keyboard, mouse device, specialized selection keys, a touchscreen display which may operate in response to touches, gestures, etc.) and one or more output devices 314 (a display (touchscreen or otherwise), printers, audio output mechanisms, etc.).

The user device 102 further includes a network interface(s) 316 to allow the user device 102 to communicate via a network (e.g., such as the network(s) 110) with other computing devices, such as remote computers, the data centers 108 and so forth. The network interface(s) 316 may allow the user device 102 to handle both voice and non-voice communications (such as communications for text messages, multimedia messages, media downloads, web browsing, etc.) with the network(s) 110. The network interface(s) 316 may provide network connectivity using any type of wired or wireless technology, (e.g., mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HS-DPA), Wi-Fi, etc.).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

As illustrated in FIG. 3, the program modules 308 include the dashboard service 106 (in the form of a program module(s)). In particular, the dashboard service 106 includes a dashboard collection module 318, a database module 320, a data module 322, an analysis module 324, an integration module 326, a query module 328, a visualization module 330, and a user interface module 332.

The dashboard collection module 318 of the dashboard service 106 may operate to collect information from the data centers 108. For example, with respect FIG. 1, the dashboard collection module 318 may operate to send dashboard collection requests 118 to the data center controllers 114A-114C. Upon receiving the collected data 120 from the data centers 108, the dashboard collection module 318 may operate to store the received collected data in the database module 320. An example process flow for the operation of the dashboard collection module 318 is provided below with regard to FIG. 4.

As mentioned above, the database module 320 operates to store collected data, such as collected data 120. The database module 320 may further operate to store information derived from the collected data or to store information separate and distinct from the collected data. For example, the database module 320 may the store interaction information such as a history of queries from a user in addition to collected data and other information related to the network.

The data module 322, the analysis module 324 and the integration module 326 may operate together to provide a hierarchical analytics functionality. For example, the data module 322 may interface directly to the data stored in the database module 320 and may provide an interface for the analysis module 324 to make queries of the data stored in the database module. The analysis module 324 interfaces with the data module 322 and uses the data provided by the data module 322 to conduct analyses. The analysis module 324 may provide an interface for the integration module 324 to request the results of the various analyses performed by the analysis module 324. In turn, the integration module 326 may utilize the interface provided by analysis module 324 to conduct higher level analyses based on the results of the analysis performed by the analysis module 324. In the discussion herein, the analyses conducted by the analysis module 324 and the integration module 326 may be referred to respectively as first level analyses and second level analyses. In general, these analyses may operate to find important patterns/trends, group related issues, identify problematic issues, measure impact of events and network changes, perform correlation across data sources and do root-cause analysis, perform automated mitigation, and so on.

In addition to the inter-module interfaces described above, each module 322-326 may expose or provide an interface to the module's functionality (such by providing an application programming interface (API)) to allow for the user 104 and/or third-party software to access the functions of the different layers of the hierarchical network analytics system. As such, the above-described hierarchical interfaces may allow for the systems and techniques described herein provide a hierarchical analytics functionality to a user 104 of the user device 102. Additional information regarding example functionality of the modules 322-324 is provided below with respect FIG. 5.

As mentioned above, each of modules 322-324 may expose or provide an interface to the module's functionality, such by providing an application programming interface (API), to allow for access to that functionality by the user or other program modules. The query module 328 may operate to provide an interface to the user or other programs without the use of such an API (e.g., pre-configured queries and presentations for the results of the queries). Additionally, the query module 328 may provide functionality to allow for the data stored in the database module 320 which is utilized by the data module 322 to be preprocessed based on various properties or scopes. Additional details of the query module 328 are provided with respect to FIGS. 6-8.

The visualization module 330 may operate to construct visualizations (e.g., graphs, charts, diagrams, etc.) based on various information provided by the data module 322, the analysis module 324 and/or the integration module 326. Of course, the visualization module 330 is not limited to operating on data provided by the above-mentioned modules and said may operate on data provided by any source to create visualizations to be presented to the user 104. Additional information regarding example implementations of the visualization module 330 are provided below with respect to FIGS. 9-15.

The user interface module 332 may operate to provide an interface to the user 104 that allows the user 104 to interact with the dashboard service 106. For example, the user interface module may provide a graphical user interface for the user to access the query module 328 and visualization module 330 and for rendering or otherwise presenting the results of the user's queries or interactions.

Figure 4:
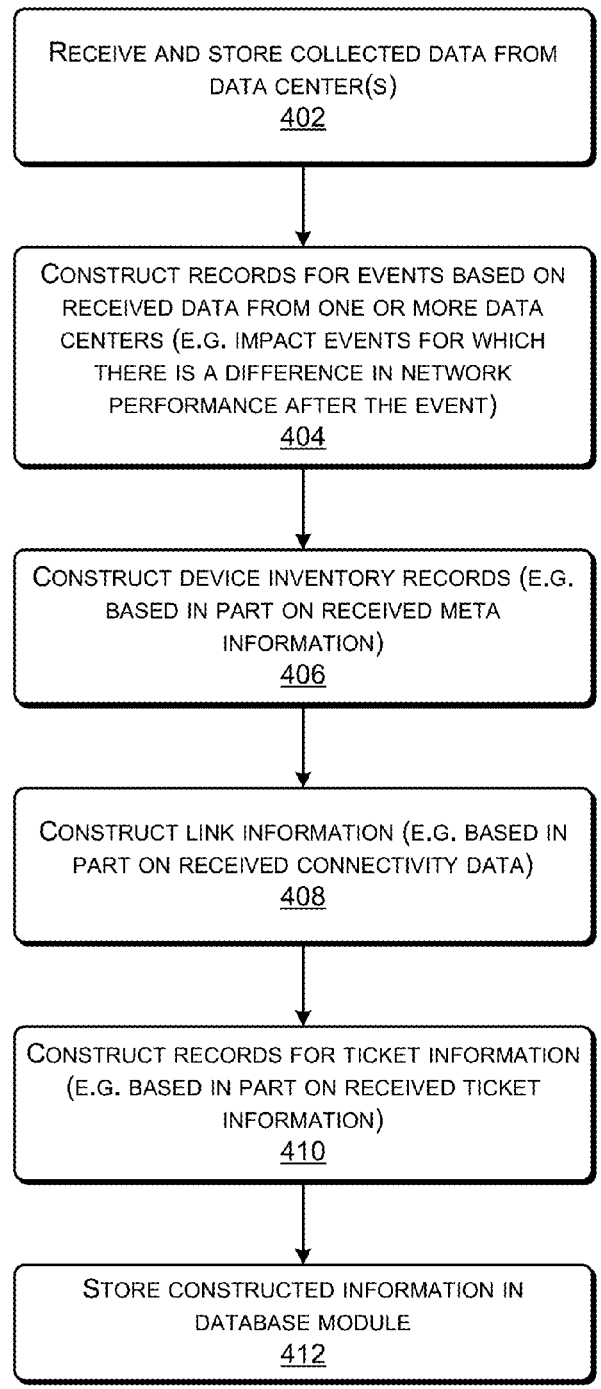
FIG. 4 illustrates an example process flow according to some implementations by which a dashboard collection module may interface with the data centers and store collected information in the database module.

FIG. 4 illustrates an example process flow 400 according to some implementations. In particular, the process flow illustrates an example process by which a dashboard collection module 318 may interface with the data centers 108 to collect information and store the collected information in the database module 320. In addition, the process flow 400 additionally provides for initial processing of the "raw" collected information into a form for storage in the database module 320.

At 402, the dashboard collection module 318 may request collected data from the data centers 108 and then receives and stores the collected data.

At 404, the dashboard collection module 318 may construct records for events based on received collected data from one or more data centers. In some implementations, the dashboard collection module 318 may operate to filter the events and to construct records for the events based on the filtering. For example, the dashboard collection module 318 may determine events for which there a measurable difference appeared in network performance after the event (i.e., impact events) and construct records for the determined impact events. For example, to determine if an event had an impact on traffic throughput, in some implementations, the dashboard collection module 318 may utilize the link information and traffic flow information to determine a ratio of the median traffic across the failed link or device during the failure event and the value of the traffic across the link in the past (e.g., the eight hours preceding the start of the failure). The dashboard collection module 318 may discard information relating to non-impact events or records for the non-impact event information may be constructed but stored separately or otherwise differentiated from the impact event records. Of course, impact events are merely an example and other types of filtering may be applied to the events by the dashboard collection module 318.

At 406, the dashboard collection module 318 may construct or update device inventory records from the received information (e.g., based in part on received meta information). For example, the device inventory may contain all devices ever found in the collected data. The device information from which the dashboard module 318 may construct the device inventory may be collected from multiple sources over time including msnconf, msndevices, cached tables, Cricket data, and so on.

At 408, the dashboard collection module 318 may construct link information (e.g., based in part on received connectivity data). For example, in some implementations, the dashboard collection module 318 may reverse-engineer the link information from traffic flow data, such as Cricket traffic data over a period (e.g., the previous month).

At 410, the dashboard collection module 318 may construct records for ticket information (e.g., based in part on received ticket information). For example, in some implementations, the dashboard collection module 318 may generate the records for ticket information based on trouble tickets associated with the aforementioned determined impact events. More particularly, identification of trouble tickets associated with impact events may be obtained and records may be created for these trouble tickets.

At 412, the dashboard collection module 318 may store the constructed information in the database module 320.

Figure 5:
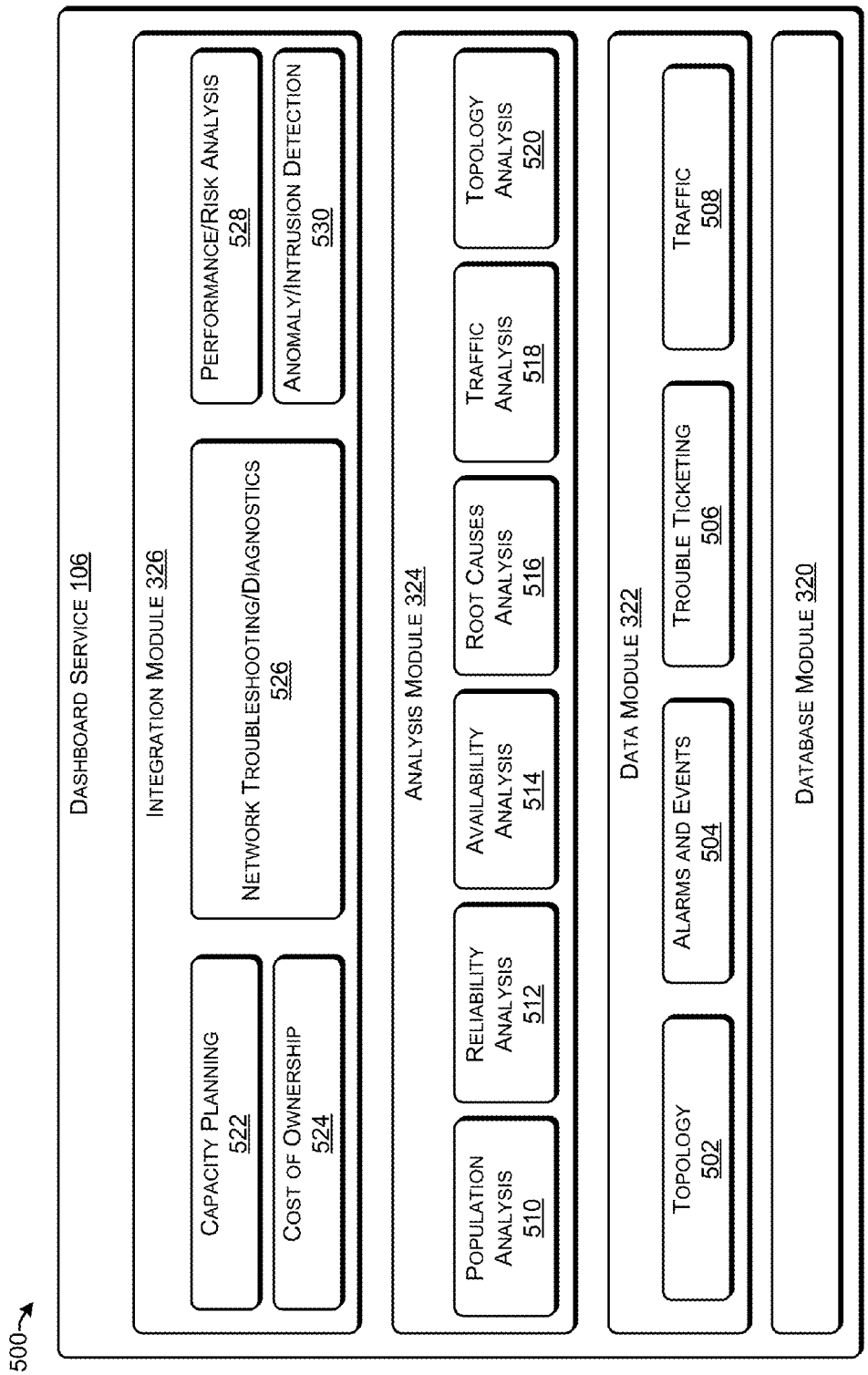
FIG. 5 illustrates an example logic diagram of an illustrative dashboard service illustrating the hierarchical analytics functionality structure of the dashboard service according to some implementations.

FIG. 5 illustrates a logic diagram 500 of an illustrative dashboard service 106 according to some implementations. More particularly, the logic diagram 500 illustrates the hierarchical analytics functionality structure of the dashboard service 106. In the diagram illustrated in FIG. 5, the dashboard service is shown as including the database module 320, the data module 322, the analysis module 324 and the integration module 326.

The modules 322-326 are illustrated as including items 502-530 which are representative of various types of functions performed by the module including the item. In some implementations, the items 502-530 may be implemented as submodules of the module 322-326 which perform types of functionality indicated by the submodules name. For example, the data module 322 may include a topology submodule, an alarms and events submodule, a trouble ticketing submodule and a traffic submodule. In some implementations, rather than or in addition to submodules, items 502-530 may be implemented and representative of categories or groups of API calls supported by modules 322-326. The functionality of the modules 322-326 and of items 502-530 is discussed below.

As mentioned above, the data module 322 may include a topology item 502, an alarms and events item 504, a trouble ticketing item 506 and a traffic item 508. Items 502-508 may represent submodules or categories of API calls for performing a functionality related to the name of the item. The following is an example list of API calls that may be included in the items 502-508.

TABLE 1

Example API Calls Supported by Data Module 322

| Topology 502 | Alarms and Events 504 |
|---|---|
| GetConnectivityByDevice | GetFailuresByDevice |
| GetSubTreeByDevice | GetFailureStatsByDevice |
| GetRedundancyGroupByDevice | GetFailureEventTimeseries |
| GetPopulation | GetFailureStatsGetTotalLinkCount |
| GetTopology | |
| GetTotalDeviceCount | |
| GetTotalLinkCount | |

| Trouble Ticketing 506 | Traffic 508 |
|---|---|
| GetTicketInfoByID | GetTrafficByDevice |
| GetTicketsByDevice | GetTrafficByLink |
| GetTicketByEngineer | GetRedundancyGroupTrafficByDevice |
| GetEngineersInvolvedByDevice | GetRawTraffic |
| GetTickets | GetLinkUtilization |
| GetTicketShortDesc | GetLossError |
| GetAllEngineers | |

Each example API call above may be seen as a request for data from the database module 320 and may involve some level of processing. A discussion of some examples of the API calls of the data module 322 follows.

The topology 502 call, "GetTopology," may operate using device inventory information and link information stored in the database module 320 to construct a network topology including the links interconnecting the devices known to the system (and stored in the database module 320). The alarms and events 504 call, "GetFailureStatsByDevice," may operate on information stored in the database module 320 to return a number of stored trouble tickets for a given device, number of stored events (e.g., impact events) for the device and a list of the trouble ticket identifiers of tickets associated with the device. The alarms and events 504 call, "GetFailuresByDevice," may operate to return impact events stored in database module 320 that are associated with a given device. Similarly, the trouble ticketing 506 call, "GetTicketsByDevice," may operate to return trouble tickets stored in database module 320 that are associated with a given device. The trouble ticketing 506 call, "GetEngineersInvolvedByDevice," may operate to return engineers identified by trouble tickets stored in database module 320 that are associated with a given device. The traffic 508 call, "GetRedundancyGroupTrafficByDevice," may operate utilizing various types of information stored in the database module 320 to 1) determine the redundancy group of a given device and 2) determine the amount of traffic flowing through or to the devices of the redundancy group (e.g., during a specified period of time).

Some or all calls may support options rather than having exact searches (e.g., by device name or other identifier). The options may be provided as parameters of the calls and may be optional parameters or required parameters. For example, some calls may support options such as device type, data center, time or range of time and/or a property option.

As an example, the alarms and events 504 call, "GetFailureStats," may operate to perform operations similar to those of "GetFailureStatsByDevice" based on such options. In some implementations, the call, "GetFailureStats(TopOfRack, DataCenter1, mail)," may cause the data module 322 to return information similar to that discussed above for "GetFailureStatsByDevice" but based on event records stored in the database module 320 that are associated with a top of rack device in DataCenter1 and that include the property, "mail" (e.g., a mail application). Similarly, the topology 502 call, "GetTopology," may support such optional parameters. For example, the call, "GetTopology(Datacenter:DataCenter1, Property:mail)" may construct a network topology including the links interconnecting the devices in DataCenter1 that have the property, "mail" (e.g., devices that are associated with a mail application given the property mail).

As shown in FIG. 5, the analysis module 324 may include a population analysis item 510, a reliability analysis item 512, an availability analysis item 514, a root causes analysis item 516, a traffic analysis item 518 and a topology analysis item 520. As with the items of the data module 322, items 510-520 may represent submodules or categories of API calls for performing a functionality related to the name of the item. The following is an example list of API calls that may be included in the items 512-518.

TABLE 2

Example API Calls Supported by Analysis Module 324

| Reliability Analysis 512 | Availability Analysis 514 |
|---|---|
| GetAnnualFailureRateByDevice<br>Get AnnualFailureRate<br>GetTopKBadDevices<br>GetTopKBadLinks | GetAvailabilityByDevice<br>GetAvailabilityForDeviceSubtree |
| Root Cause Analysis 516 | Traffic Analysis 518 |
| GetRootCausesByDevice<br>GetRootCausesMultipleDevices<br>GetRootCauses | GetTrafficStatsByDevice<br>GetHighUtilizationLinks<br>GetRedundancyGroupTrafficStatsByDevice |

Each example API call of the analysis module 324 may be seen as a request for the result of an analysis utilizing information provided by the calls or functionality of data module 320. In other words, the analyses invoked by calls to the analysis module 324 are based on the results of, and utilize data provided by, the data module 320. Further, as with the calls of the data module 320, some or all of the calls of the analysis module 324 may support parameters that may be optional parameters or required parameters. A discussion of some examples of the API calls of the analysis module 324 follows.

The Reliability Analysis 512 call, "GetTopKBadDevices," may operate using information returned by the "GetTickets" call and the "GetFailures" call of the data module 322 to determine the K devices having the most trouble tickets and impact events associated with the devices. The result returned by the "GetTopKBadDevices" call may be a list of K devices, the number of trouble tickets and failures associated with each of the devices, and a list of trouble ticket identifiers associated with each device.

Similarly, the traffic analysis 518 call, "GetHighUtilizationLinks," may operate using information returned by the "GetLinkUtilization" call of the data module 322 to determine the most highly utilized links in a topology which may be filtered based on the parameters of the "GetHighUtilizationLinks" call. For example, in some implementations, a call of "GetHighUtilizationLinks(Datacenter:DataCenter1, Top:10)" may return a list of the top ten highest utilized links in the topology of DataCenter1.

Figure 12:
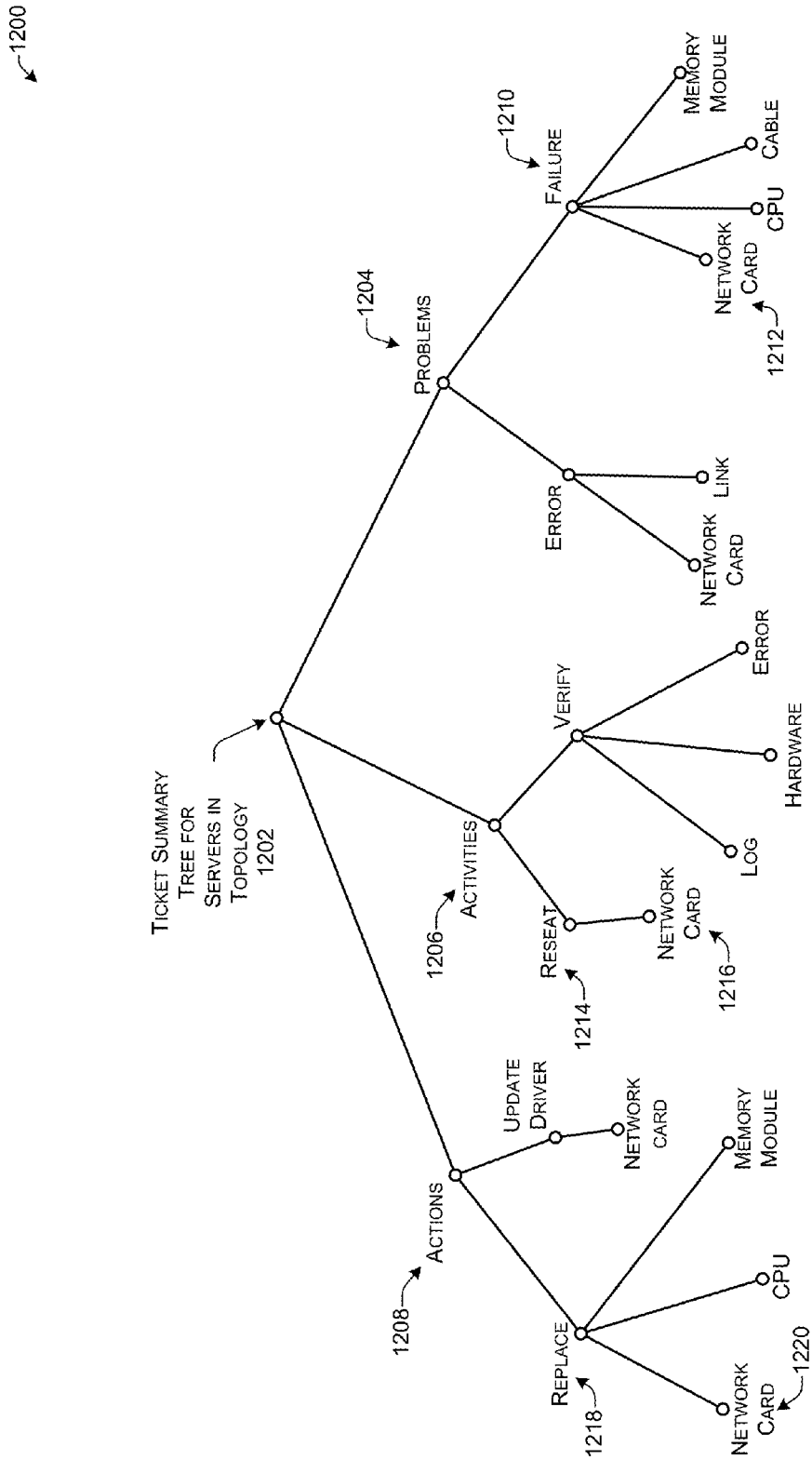
FIG. 12 illustrates an example visualization according to some implementations that may be generated by a graph/chart rendering module of a visualization module.

The root cause analysis 516 call, "GetRootCausesByDevice" may return information regarding the root causes of issues for a given device. For example, in some implementations, the root cause analysis may operate to return ticket or event/problem pairs related to tickets or impact events associated with the device. The problem portion may include pairs of 1) a noun and 2) a noun, verb or adjective that describing the problem with the first noun. Some example problem pairs may include: network card/failing; link/flapping; fiber/cut; firmware/corrupted; profile/misconfigured; switch/failure; link/error; utilization/high and so on. In some implementations, root cause analysis 516 calls mailroom to provide problem/activity/action information. In other words, at least part of the results of such calls is a triplet comprising a problem, activities taking with regard to the problem, and the action taken to solve the problem. An example visualization of the results of such an analysis is illustrated in FIG. 12.

The availability analysis 514 call, "GetAvailabilityByDevice," may operate to return information regarding the availability of the device during a given period of time. For example, the availability analysis may be based on information provided by the "GetFailuresByDevice," the "GetTicketsByDevice" and/or the "GetTrafficByDevice" calls of the data module 322. More particularly, such an analysis may be performed by determining, for each impact event and/or ticket associated with the device during the given time period, whether the device was available to handle traffic. This information may be utilized to determine the percentage of the given time period the device was available.

As shown in FIG. 5, the integration module 326 may include a capacity planning item 522, a cost of ownership item 524, a network troubleshooting/diagnostics item 526, a performance/risk analysis item 528, and an anomaly/intrusion detection item 530. As with the items of the data module 322 and analysis module 324, items 522-530 may represent submodules or categories of API calls for performing a functionality related to the name of the item. A discussion of items 522-530 and some potential example API calls are given below.

TABLE 3

Example API Calls Supported by Integration Module 326

| Capacity Planning 522 | Cost of Ownership 524 |
|---|---|
| GetNumberOfStamps<br>GetPerf<br>GetUtilization | GetProductLinesToDecommission<br>GetCosts |
| Network Troubleshooting/Diagnostics 526 | |
| GetProbableCauses<br>GetResolution | |
| Performance/Risk Analysis 528 | Anomaly/Intrusion Detection 530 |
| GetProbabilityOfNextFailure | TrainModel<br>TestModel<br>GetOutlierConfidence |

The capacity planning item 522 may perform operations to determine the amount of server hardware resources required to provide the desired levels of service for a given workload mix for the least cost. In other words, the capacity planning item 522 may assist in designing an infrastructure to guarantee a service level agreement (SLA). The following discussion provides details of the example API calls given above.

The capacity planning 522 call, "GetNumberOfStamps," may operate to provide, for a given SLA number (e.g., defined in terms of availability), a number of independent network stamps (e.g., for a network comprising access routers, aggregation switches and top-of-rack switches) that are needed to meet the SLA requirements. Such a determination may be complex and involve multiple steps. In some implementations, the capacity planning item 522 may analyze the availability of a network stamp hosting the service and then compute the number of network stamps needed to meet the service SLA based on a parallel configuration (i.e., at least one network stamp should be available at any given point in time). Therefore, to obtain the availability, the determination may include ascertaining the failure characteristics of the individual components comprising a network stamp and the effectiveness of network redundancy. An example process may operate by obtaining a list of devices and links from the Population Analysis item 510, requesting the availability of the devices and links from the Availability item 514 and determining the number of stamps based on the obtained information.

The capacity planning 522 call, "GetUtilization," may operate to provide a measure of utilization (i.e., ratio of the current usage level to the total possible usage level). For example, such a measure of utilization may allow for a network operator to determine if network infrastructure is being under-utilized. Such a determination may be made based on similar information and in a similar manner to that discussed above with regard to the "GetNumberOfStamps" call.

Of course, the above described functions of the capacity planning item 522 are merely examples and implementations are not so limited. Some examples of additional functionality provided by the capacity planning item 522 may relate to capacity benchmarking (e.g., to setting up a configuration of hardware/software and load testing the setup with traffic to see how it performs), capacity trending (e.g., predicting when to re-configure the infrastructure e.g., server consolidation) and capacity modeling (which includes both simulation and analytic modeling of different configurations of the underlying infrastructure). More particularly, capacity planning item 522 may also provide functionality such as an analysis of which types of failures are effectively compensated for by network redundancy, utilization/failure analyses and so on. In a particular implementation of a redundancy effectiveness analysis, a call "RedundancyEffectivenessByDevice" may utilize the "GetRootCausesByDevice" and "GetRedundancyGroupTrafficStatsByDevice" to determine an average drop in redundancy group traffic statistics for different root causes of impact events experienced by a given device. An example utilization/failure analysis may be utilized to determine areas of a topology which are effectively handling current utilization but which, despite having a theoretical capacity high enough to experience the utilization growth, may not be able to cope with utilization growth due to failure rates and availability issues. Such an analysis may be based on many items of information from the analysis module 324. For example, failure rate information may be obtained from the reliability analysis item 514, availability information may be obtained from the availability analysis item 514, root cause trend information may be obtained from the root cause analysis item 516 and utilization trend information may be obtained from the traffic analysis item 518. More particularly, failure and availability information may be utilized to determine an estimated practical capacity. Utilization trend information may be utilized to identify areas experiencing upward utilization trends. Root cause trend information may be correlated to utilization trend information to identify areas in a topology experiencing a growth in both utilization and failures with the root causes linked to high utilization. Combining this information may produce a resulting analysis that may allow a network operator to identify areas needing additional capacity to handle future needs.

The cost of ownership item 526 may perform operations to provide indications of the effectiveness of utilizing a given device in a network (i.e., whether the device or type of device should be retired or, if appropriate, repaired or replaced with a same device). More particularly, in the context of networks, devices can fail (and sometimes, fail multiple times). Each failure may require resources (in terms of man power, financial investments, etc.) to get the device repaired. When a device fails, the device may be repaired or replaced. The determination may be made by computing the cost-of-ownership which includes capital, operational, and repair and maintenance costs for the device.

The cost of ownership 526 call, "GetProductLinesToDecommission," may operate to detect bad product lines in a datacenter or network (e.g., analyze patterns of failures to see if devices belonging to a particular product vendor are failing constantly) and suggest the bad product lines as candidates for replacement with a new product line. For example, such a cost of ownership analysis may utilize information provided by the root cause analysis item 516 and the reliability analysis item 512 to derive the effectiveness of repairing and/or replacing a type of device (e.g., a model of router). Further, information may be requested from the traffic analysis item 518 to show the impact of failures caused by the type of device. Utilizing that information, the cost of ownership of the type of device may be compared with the cost of replacing the type of device with a different type of device (e.g., a different model of router).

Some example functionality provided by the network troubleshooting/diagnostics item 526 may relate to items such as an analysis of which troubleshooting operation to prioritize, which devices to prioritize for troubleshooting or an analysis of which types of root causes most likely result in symptoms observed in network devices.

The network troubleshooting/diagnostics item 526 call, "GetResolution," may be an example of a troubleshooting operation prioritization analysis. In some implementations, it may be useful to understand why devices fail when they do fail. Subsequently, this information may be utilized to suggest troubleshooting operations for these problems which may be potential resolution actions that may be executed to resolve the problem. This type of suggestion may be made possible based on the history of device failures. In some implementations, the "GetResolution" call may utilize information such as information provided by the root cause analysis item 516 and the traffic analysis item 518. For example, this call may take a list of problem symptoms (e.g., device hung, memory corrupt, etc.) and return a string of potential resolution steps (e.g., 1. Check for bad memory, 2. Replace memory)

As stated above, some implementations may provide a device troubleshooting prioritization function. Such a function may operate based on the results of the "GetTopKBadDevices" and "GetHighUtilizationLinks" calls to determine the highest failing devices (e.g., from the "GetTopKBadDevices" call) and to determine which of the top-K failing devices are involved in highly utilized links (e.g., from the "GetHighUtilizationLinks" call). Using such a determination, a network operator may choose to troubleshoot a device which has had the most failures and which is most highly utilized in the functioning of the network or datacenter.

An example "most likely cause" analysis may utilize information provided by the root cause analysis item 516, the reliability analysis item 512 and the topology analysis item 520 to derive a ranked list of possible causes for reported issues. For example, the topology analysis item 520 may be queried to determine the topology information in an area of a network reporting a failure. In a particular scenario in which such information may be useful, a server may report corrupt data being received, a problem that may be influenced or caused by any number of the nearby devices. The root cause analysis item 516 may be queried for information regarding failures in devices of a same or similar model to the devices present in the topology information where the failures have similar "problem" or "symptom" data to that currently in question. The reliability analysis item 512 may then be queried for information regarding the relative frequency of the root causes found in the similar devices when similar "problem" or "symptom" data is present. This information may be used to create the above mentioned ranked list of possible causes for the reported issue.

The performance/risk analysis item 528 may perform operations to provide information regarding when a given device or a rack of devices might experience a failure in order to be able to plan an execution strategy. The performance/risk analysis 528 call, "GetProbabilityOfNextFailure," may operate to estimate when a given device or a rack of devices might experience a failure. Such an analysis may operate based on information provided by the root cause analysis item 516 and the traffic analysis item 518 and may compute a probability that a given device will fail within a specified time period.

The anomaly/intrusion detection 530 may perform operations to provide information regarding when a network is being utilized in un-anticipated ways (e.g. monitoring for security purposes) or being over-utilized. The anomaly/intrusion detection 530 calls, "TrainModel," "TestModel" and "GetOutlierConfidence," may operate to first train a model using data, test the trained model based on data and then put the model into operation using "GetOutlierConfidence" to understand whether or not an anomaly has been detected.

The above discussion provided many example details regarding the example functionality and/or example API calls of a hierarchical analytics system such as that shown in FIG. 5. However, implementations of the techniques and systems according to this disclosure are not limited to the above described details. Many other categories and/or types of functionality and/or APIs may be utilized in various implementations. In other words, in some implementations, an analysis module 324 may include other and/or different items from items 510-520 or the types of functionality may not be divided into different items. Implementations of the data module 322 and integration module 326 may be similarly varied. For example, the performance/risk analysis item 528 may also provide for analyses related to improvements in performance, reliability and security in view of risks of failures that may be experienced if modifications are made to a given network. In some implementations, the modules 322-326 may be combined into any number of modules (i.e., one or more) which provide a hierarchical arrangement of analytic functionality. Moreover, example procedures for several example functions and/or API calls were provided above. Implementations are not so limited and additional and/or other procedures may be used and would be apparent to one of ordinary skill in the art in view of this disclosure. These and other variations on the details of the systems and techniques described above procedure would be apparent to one of ordinary skill in the art in view of this disclosure.

Figure 6:
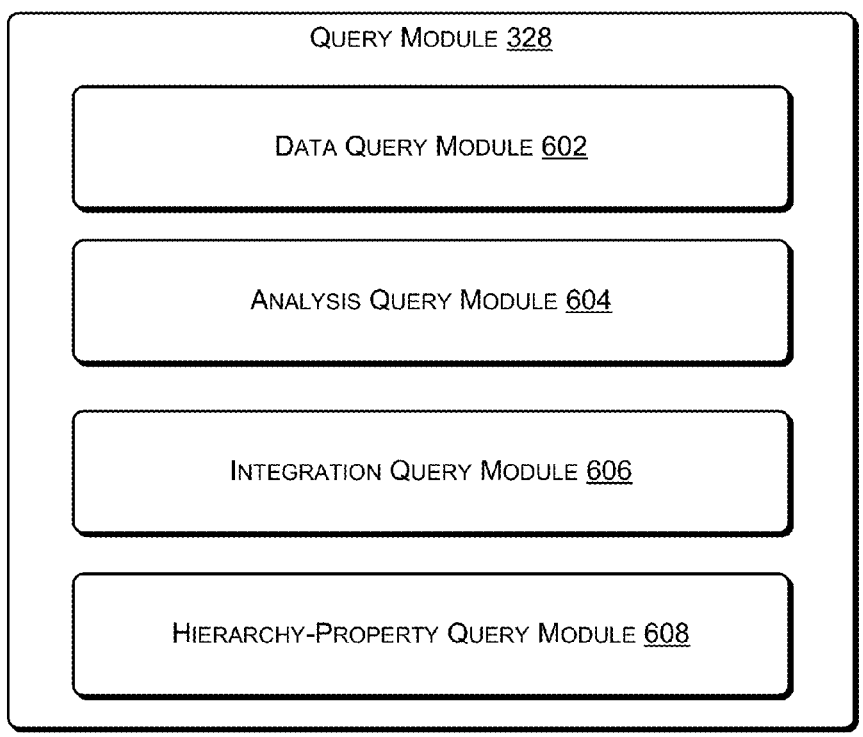
FIG. 6 illustrates an example logic diagram of an illustrative query module according to some implementations

FIG. 6 illustrates a logic diagram 600 of an illustrative query module 328 according to some implementations. More particularly, the logic diagram 600 illustrates query module 328 as including a data query module 602, an analysis query module 604, an integration query module 606 and a hierarchy-property query module 608. Each of the modules 602-608 may operate to provide an interface to one or more of the database module 320, the data module 322, the analysis module 324 and/or the integration module 326. For example, the module 602-608 may provide such interfaces to the visualization module 330 and/or the user interface module 332.

In some implementations, the data query module 602, the analysis query module 604 and the integration query module 606 may operate as pass-through modules which operate to accept queries, format the queries into an appropriate form for the respective module 322-326 and pass formatted query to the respective module 322-326. The modules 602-606 may receive the results of the queries, format the results into an appropriate form for the requestor and return the formatted results. Of course, in other implementations, the modules 602-606 may operate to perform additional functions, such as conducting issuing calls to each level of the hierarchical analytics system. Such an example implementation is discussed with regard to FIG. 7.

Some implementations may include a hierarchy-property query module 608 as shown in FIG. 6. In some implementations, the hierarchy-property query module 608 may operate to preprocess information to be provided by the database module 320 to the data module 322. For example, in some implementations, the hierarchy-property query module 608 may receive a query that requests database module 320 to limit results provided to the data module 322 to a particular data center, a particular device type, a particular property, and so on. In some implementations, the hierarchy-property query module 608 may instruct the database module 320 to redirect results to queries from the data module 322 to the hierarchy-property query module 608. Upon receiving the redirected results, the hierarchy-property query module 608 may preprocess the results such that the results are limited to results, for example, of a particular data center, a particular device type, a particular property, and so on. An example process flow for the operation of the hierarchy-property query module 608 is discussed below with regard FIG. 8.

Figure 7:
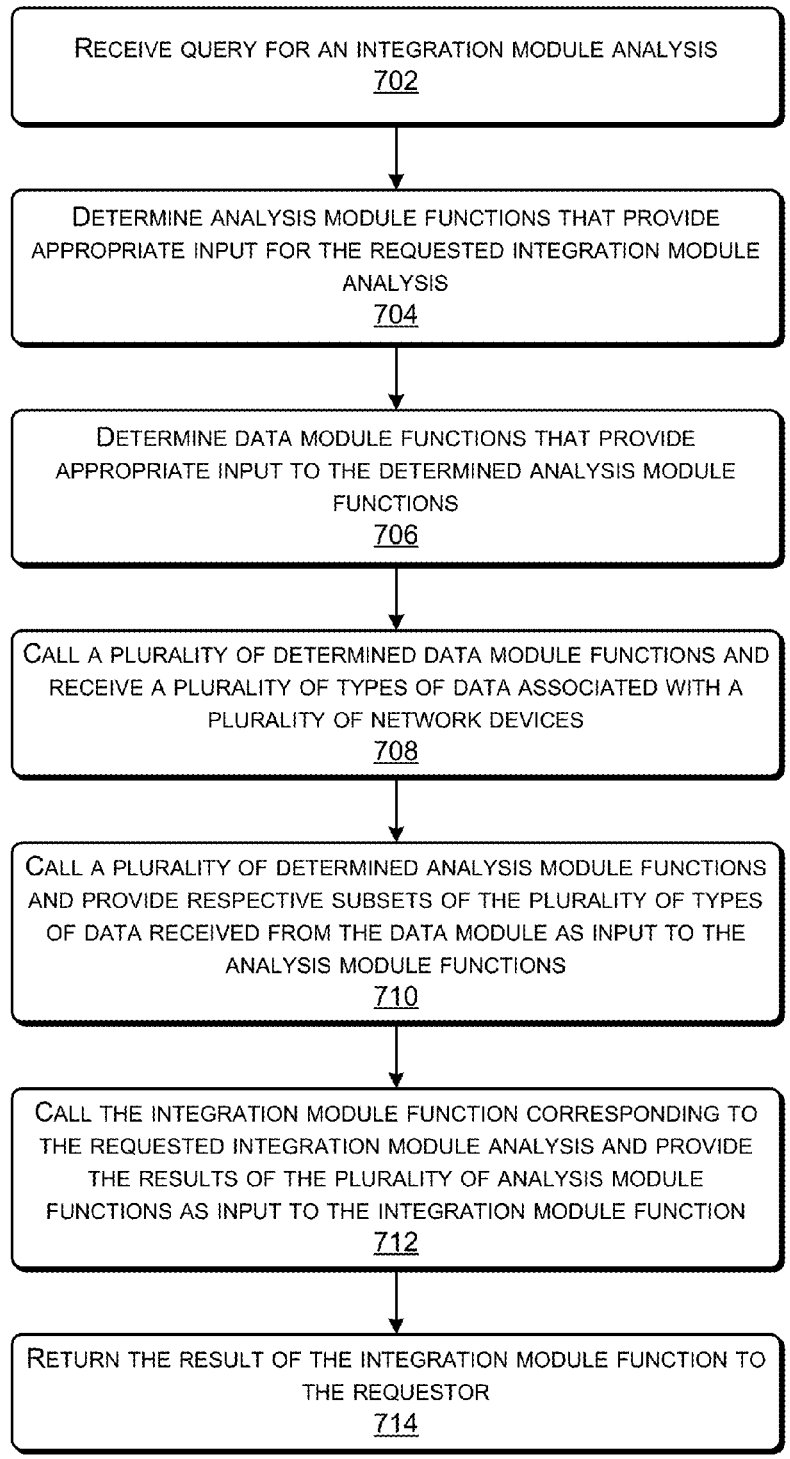
FIG. 7 illustrates an example process flow according to some implementations by which a query module may provide for an interface between the data module, the analysis module, the integration module and the user interface module.

FIG. 7 illustrates an example process flow 700 according to some implementations. In particular, the process flow 700 illustrates an example process by which a query module 328 provides for an interface between the data module 322, the analysis module 324, the integration module 326 and the user interface module 332. In other words, in some implementations that operate as illustrated in FIG. 7, the data module 322, the analysis module 324 and the integration module 326 operate as APIs accessible by the query module 328. In such implementations, the API calls of each of the analysis module 324 and the integration module 326 receive results of lower levels of the hierarchical analytics system as inputs instead of or in addition to making the calls to the lower levels directly.

At 702, the query module 328 may receive a query for an integration module analysis. At 704, based on the requested integration mode analysis, the query module 328 may determine analysis module functions that provide the appropriate input to the requested integration module analysis. At 706, the query module 328 may determine data module functions that provide appropriate input to the determined analysis module functions.

At 708, the query module 328 may call a plurality of the determined data module functions and receive a plurality of types of data associated with a plurality of network devices. At 710, the query module 328 may call a plurality of the determined analysis module functions and provide respective subsets of the plurality of types of data received from the data module as input to the analysis module functions. At 712, the query module 328 may call an integration module function corresponding to the requested integration module analysis and provide the results of the plurality of analysis module functions as input to the integration module function.

At 714, the query module 328 may return the result of the integration module function to the requester corresponding to the received query.

Figure 8:
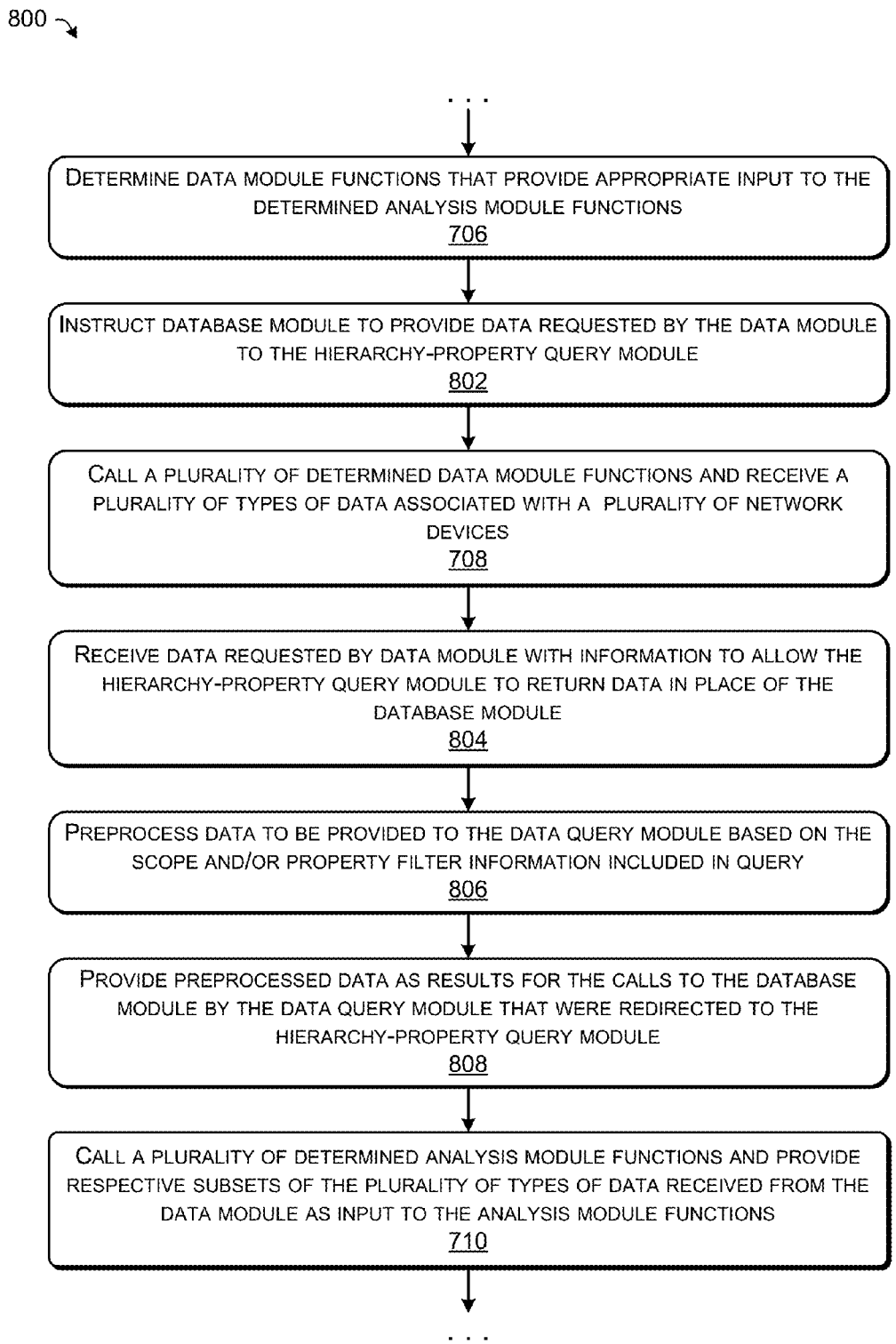
FIG. 8 illustrates an example process flow according to some implementations by which a query module may operate to provide for hierarchical analytics that are based on preprocessed (e.g., filtered data).

FIG. 8 illustrates an example process flow 800 according to some implementations. In particular, the process flow 800 illustrates an example process by which a query module 328 and, more particularly, the hierarchy-property query module 608 operates to provide for hierarchical analytics that are based on preprocessed (e.g., filtered data). The illustrated process flow 800 is shown in the context of the process flow 700. In particular, the operations of the hierarchy-property query module 608 are shown between operations 706 and 708 as well as between operations 708 and 710 of process flow 700. For brevity, the discussion of the operations of process flow 700 occurring before 802 and after 808 will not be repeated below.

At 802, the hierarchy-property query module 608 may instruct the database module 320 to provide data requested by the data module 322 to the hierarchy-property query module 608. Subsequent to 802, the data module responds to calls to the plurality of a module functions by requesting data from the database module 320.

At 804, the hierarchy-property query module 608 may receive the data requested by the data module 322 along with information to allow the hierarchy-property query module 608 to return data in place of the database module 320. At 806, the hierarchy-property query module 608 may preprocess the data received from the database module based on the scope and/or property filter information included in the query received by the query module 328. For example, in some implementations, a scope filter may include an identification of a particular data center to be the subjected to the requested analysis. An example of property filter information may be an identification of a type of network device or link (e.g., access router or top of rack router) which is to be the subject of the requested analysis.

At 808, the hierarchy-property query module 608 may provide the preprocessed data to the data module 322 as results of the calls by the data module 322 to the database module 320. Subsequent to 808, the process flow 700 continues from 710.

Figure 9:
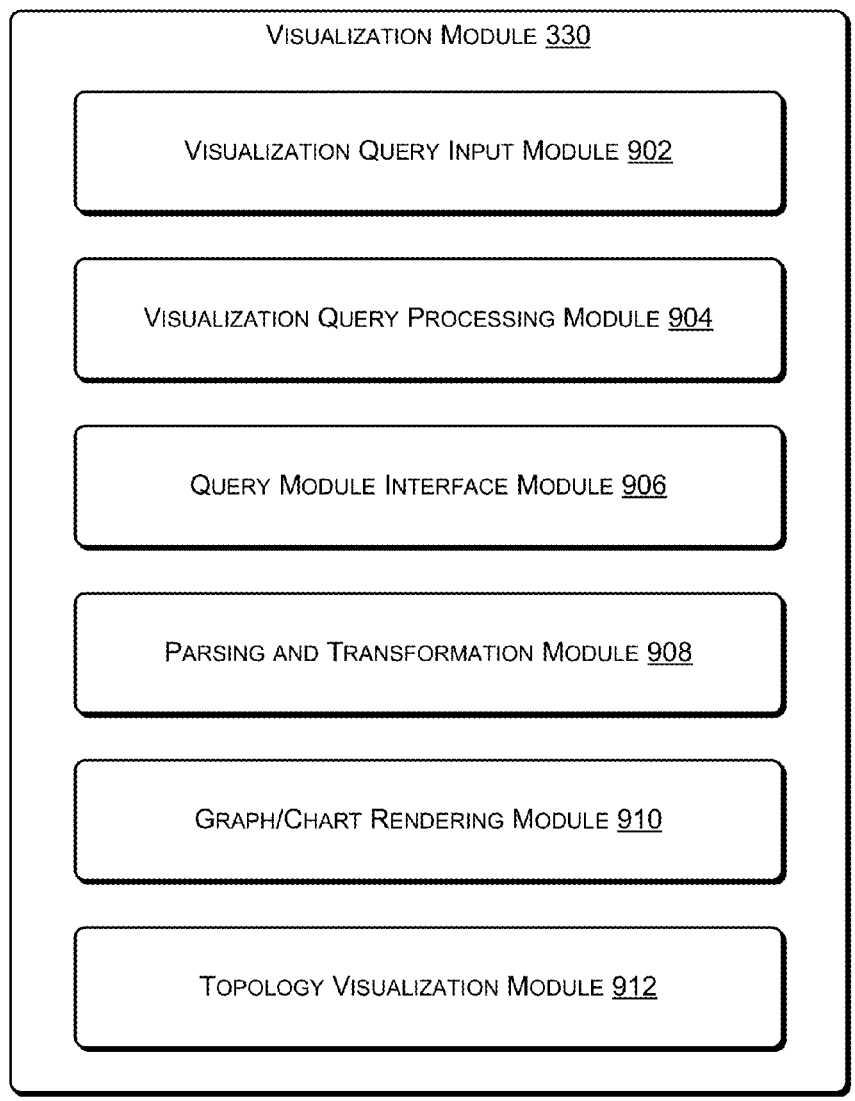
FIG. 9 illustrates an example logic diagram of an illustrative visualization module according to some implementations.

FIG. 9 illustrates a logic diagram 900 of an illustrative visualization module 330 according to some implementations. More particularly, the logic diagram 900 illustrates the visualization module 330 as including a visualization query input module 902, a visualization query processing module 904, a query module interface module 906, a parsing and transformation module 908, a graph/chart rendering module 910 and a topology visualization module 912.

The visualization query input module 902 may operate to receive queries for visualizations from the user interface module 332. The received queries are passed to the visualization query processing module 904. The visualization query processing module 904 may operate to process the visualization query to determine an appropriate query or queries to be made to the query module 328 to construct the requested visualization as well as additional processing to be performed on the results of the query or queries, if any, to provide the visualization(s) indicated by the visualization query. The visualization query processing module 904 may pass the determined query or queries to the query module interface module 906. In turn, the query module interface module 906 may operate to submit the determined query or queries to the query module 328 and to receive the results of the submitted query or queries.

The parsing and transformation module 908 may operate to perform any additional processing, such as parsing or transformation of the received data, which was determined by the visualization query processing module 904. Once the additional processing has been performed, the data is provided to the graph/chart rendering module 910 and/or the topology visualization module 912. The graph/chart rendering module 910 and the topology visualization module 912 generate the visualizations determined by the visualization query processing module 904 based on the provided data. In some implementations, the graph/chart rendering module 910 and the topology visualization module 912 may also operate to generate presentations for the generated visualizations.

Figure 10:
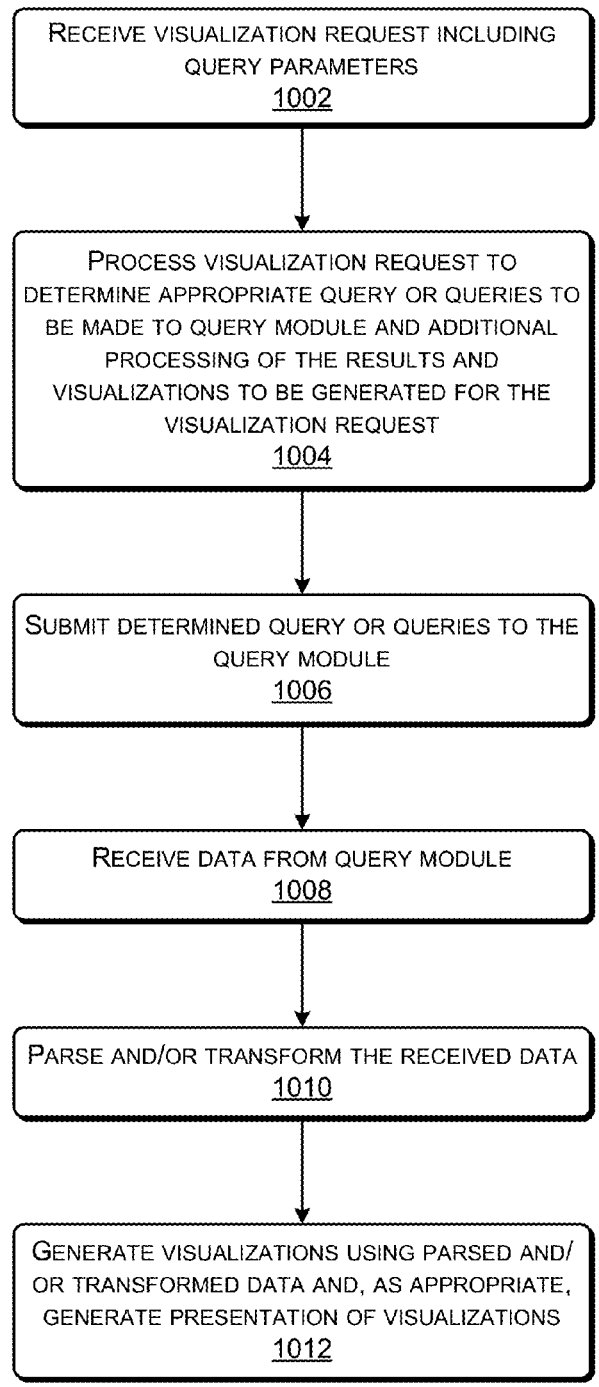
FIG. 10 illustrates an example process flow according to some implementations by which a visualization module may operate to provide visualizations in response to received visualization requests.

FIG. 10 illustrates an example process flow 1000 according to some implementations by which the visualization module 330 may operate to provide visualizations in response to received visualization requests. In particular, the process flow 1000 illustrates the operations of the visualization module 330 and the subcomponents of the visualization module 330 (i.e., modules 902-912) as described above with regard to FIG. 9.

At 1002, visualization query input module 902 may operate to receive queries for visualizations from, for example, the user interface module 332. At 1004, visualization query processing module 904 may operate to process the visualization query to determine an appropriate query or queries to be made to the query module 328 to construct the requested visualization as well as additional processing to be performed on the results of the query or queries, if any, to provide the visualization(s) indicated by the visualization query. If the visualization query does not specify particular visualizations to be provided, the visualization query processing module 904 may also operate to determine the appropriate visualizations to satisfy the visualization query.

At 1006, the query module interface module 906 may operate to submit the determined query or queries to the query module 328. At 1008, the query module interface module 906 may receive the results of the submitted query or queries.

At 1010, the parsing and transformation module 908 may operate to perform any additional processing, such as parsing or transformation of the received data, which was determined by the visualization query processing module 904.

At 1012, the graph/chart rendering module 910 and/or the topology visualization module 912 may generate the visualizations determined by the visualization query processing module 904 based on the provided data and, as appropriate, generate any presentations of the generated visualizations. Implementations according to this disclosure are not limited to any particular type of visualization. Some example visualizations that may be generated by the graph/chart rendering module 910 and/or the topology visualization module 912 include:

Spatio-temporal panoramas
Trouble ticket visualizations
Topology visualizations
Server-centric topology or connectivity visualizations
Geography-based visualizations
Device explorer visualizations
Hot congested links visualizations
Root cause visualizations
Datacenter reliability comparisons
Top-k Devices/Links visualizations
Configuration change related visualizations
Security related visualizations Some examples of these visualizations are provided below with regard to FIGS. 12-13 and 15.

While an example of the operation of the visualization module 330 is provided above with regard to FIGS. 9 and 10, implementations of the visualization module 330 are not so limited. For example, while the visualization module illustrated with respect to FIGS. 9 and 10 operates to make calls to the query module 328, implementations of the visualization module 330 may have additional or alternative functionality. An example of an alternate or additional functionality the visualization module 330 is discussed below with respect FIG. 11.

Figure 11:
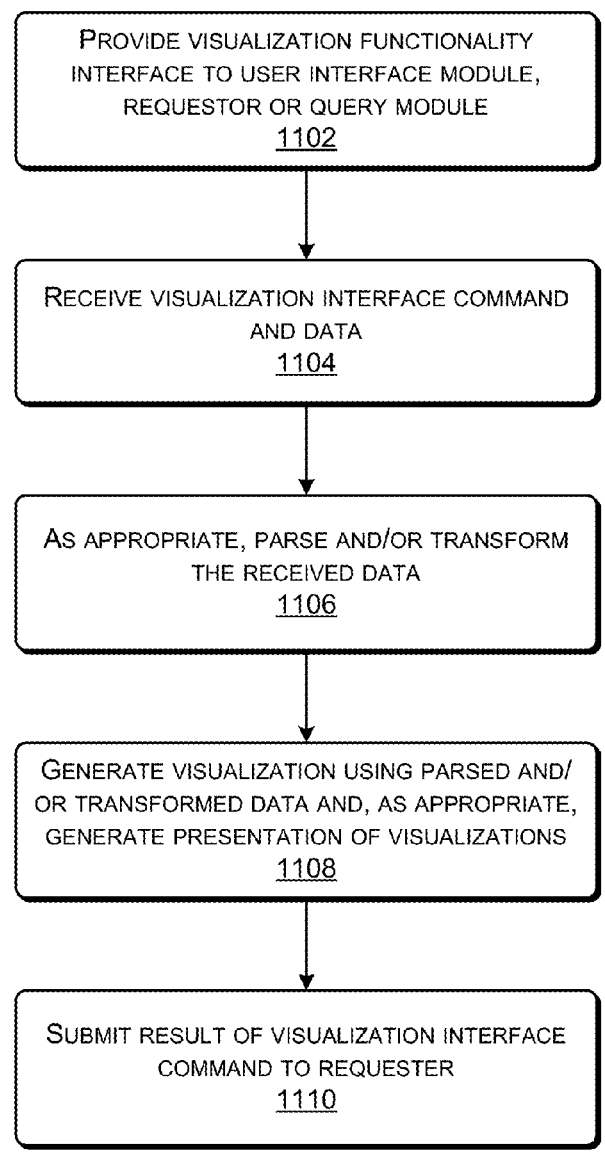
FIG. 11 illustrates another example process flow according to some implementations by which a visualization module may operate to provide visualizations in response to received visualization requests.

FIG. 11 illustrates an example process flow 1100 according to some implementations by which the visualization module 330 may operate in an alternative or additional manner to provide visualizations in response to received visualization command. In particular, the process flow 1100 illustrates the operations of a visualization module 330 that provides an interface to the visualization functionality via, for example, an application programming interface (API). Further, in the context of process flow 1100, the visualization module 330 is provided with data for the visualizations rather than determining queries and requesting such data from the query module 328.

At 1102, the visualization module 330 is initialized such that a visualization functionality interface is provided to, for example, the user interface module 332, external requester, and/or the query module 328. Such a visualization functionality interface may allow visualization commands to be issued to the visualization module along with visualization data that may be used to generate requested visualizations.

At 1104, the visualization module 330 receives a visualization interface command along with data for generating a requested visualization. At 1106, the visualization module 330 parses and/or transforms the received visualization data, if appropriate.

At 1108, the visualization module 330 generates the requested visualization using parsed and/or transformed data and, as appropriate, generates a presentation of the generated visualization.

At 1110, the visualization module submits the result of the visualization interface command to the requester (e.g., the generated visualization and/or presentation thereof).

FIG. 12 illustrates an example visualization 1200 that may be generated by the graph/chart rendering module 910 of the visualization module 330. In particular, FIG. 12 illustrates a trouble ticket summary tree for problems observed, troubleshooting activities performed, and actions taken for resolution servers in a data center topology (e.g. server devices that have failures). Such a visualization may be generated based on information provided by the network troubleshooting/diagnostics item 526. For example, the network troubleshooting/diagnostics item 526 may include a function or function(s) which return the root causes for servers of the data center along with the diagnostic activities utilized in diagnosing the root causes for those failures. The information may be combined and visualized into a summary tree such as that shown in FIG. 1200.

In particular, item 1202 indicates the root node of the summary tree for trouble tickets regarding servers in the data center topology. Root node 1202 has three direct child nodes: a problems node 1204; an activities node 1206; and an actions node 1208.

Each node 1204-1208 is the top of a respective branch corresponding to the label of the node (i.e., a branch corresponding to problems, a branch corresponding to diagnostic activities and a branch corresponding to corrective actions). The structure of each branch beneath nodes 1204-1208 is illustrated as having two levels. In the example illustrated in FIG. 12, the first level is a noun, adjective or verb (e.g. that represents an entity) that modifies a noun of the second level (e.g. which may similarly represent an entity). For example, a root cause problem portion pair of "(network card, failure)" becomes a first level of "failure" (i.e., failure node 1210) and a second level of "network card" (i.e., network card node 1212). Similarly, activity and action pairs of "(network card, reseat)" and "(network card, replace)" become a first level of "reseat" (i.e., reseat node 1214) and a second level of "network card" (i.e., network card node 1216) and a first level of "replace" (i.e., replace node 1218) and a second level of "network card" (i.e., network card node 1220). As the tree 1200 is constructed (i.e., as additional trouble tickets are processed into the tree), the branches grow to include additional nodes in the branches. Of course, while the ticket tree shown in FIG. 12 is directed to representing multiple tickets, in some implementations, the ticket tree graphically visualize a root cause analysis for a single ticket. Further, while discussed as nouns, adjectives or verbs in the context of FIG. 12, implementations are not so limited. For example, in a language other than English, the entities, states or other items represented by the layers of the tree may be represented in a different manner or by different parts of speech.

Figure 13:
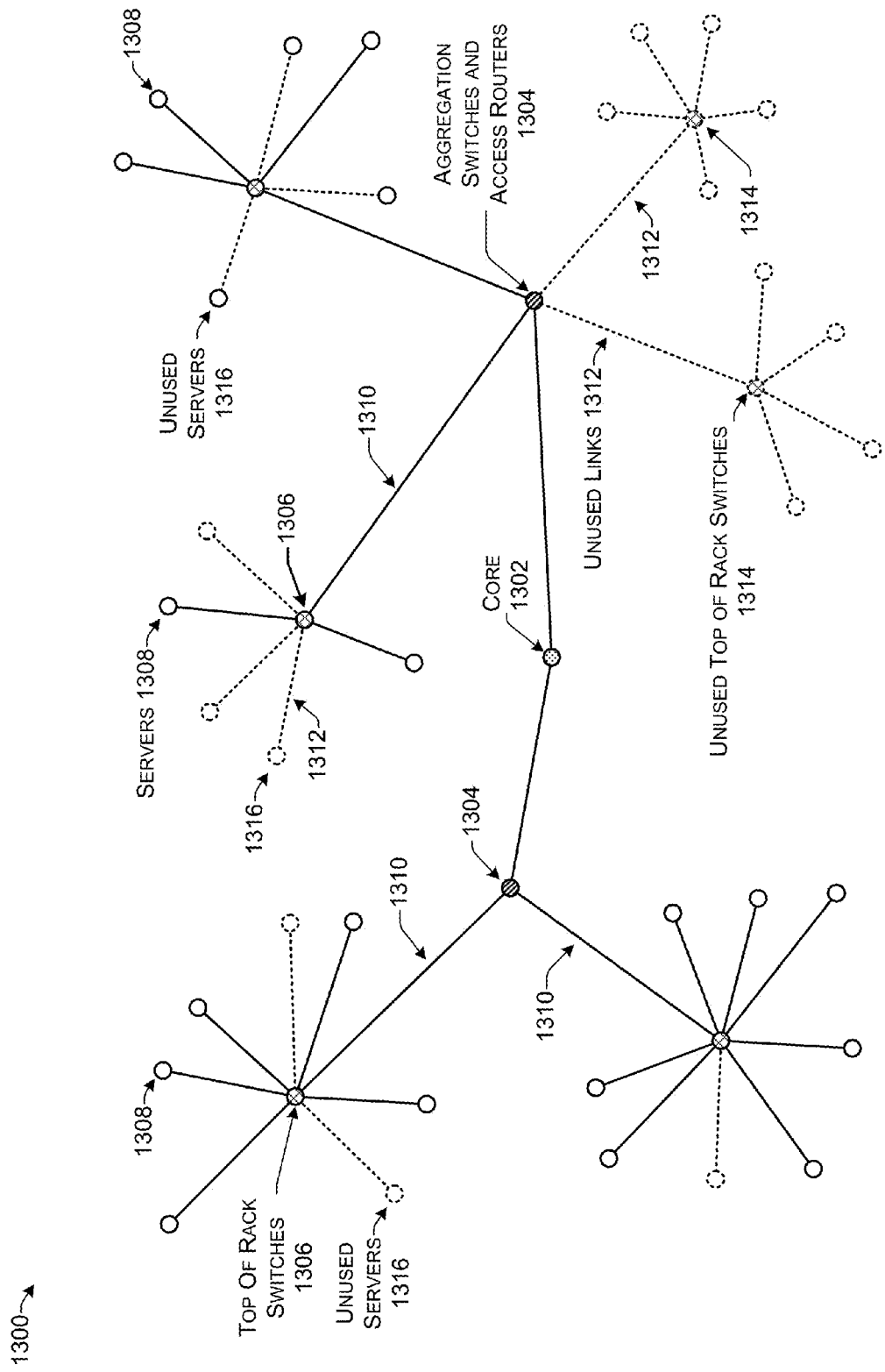
FIG. 13 illustrates an example selective topology visualization according to some implementations that may be generated by a topology visualization module of a visualization module.

FIG. 13 illustrates an example selective topology visualization 1300 that may be generated by the topology visualization module 912 of the visualization module 330. In particular, FIG. 13 illustrates a selective topology 1300 that may illustrate the devices of a data center that are being utilized by a particular application (e.g., with a property corresponding to the application). Such visualizations may be generated based on information provided by the topology analysis item 520 and the traffic analysis module 518. For example, the topology analysis item 520 may provide topology information that identifies nodes and links of the topology. The traffic analysis module 518 may provide information regarding which nodes and links of the topology are involved with traffic related to the particular application. The information may be combined and visualized into a selective topology 1300 shown in in FIG. 13.

As illustrated in FIG. 13, the selective topology 1300 includes a node for the core 1302 of the data center and nodes for aggregation switches and access routers 1304, top of rack switches 1306, servers 1308, unused top of rack switches 1314 and unused servers 1316. Edges are included that illustrate links 1310 and unused links 1312. The nodes and links utilized by the application are illustrated with solid lines (e.g., items 1302-1310) and unused nodes and links are shown with dashed lines (e.g., items 1312-1316). However, implementations are not limited to the specific details of the visualization shown in FIG. 13. For example, rather than showing the unused nodes and links as dashed lines, in some implementations, such links and nodes may be omitted or set off visually by some other cue.

Figure 14:
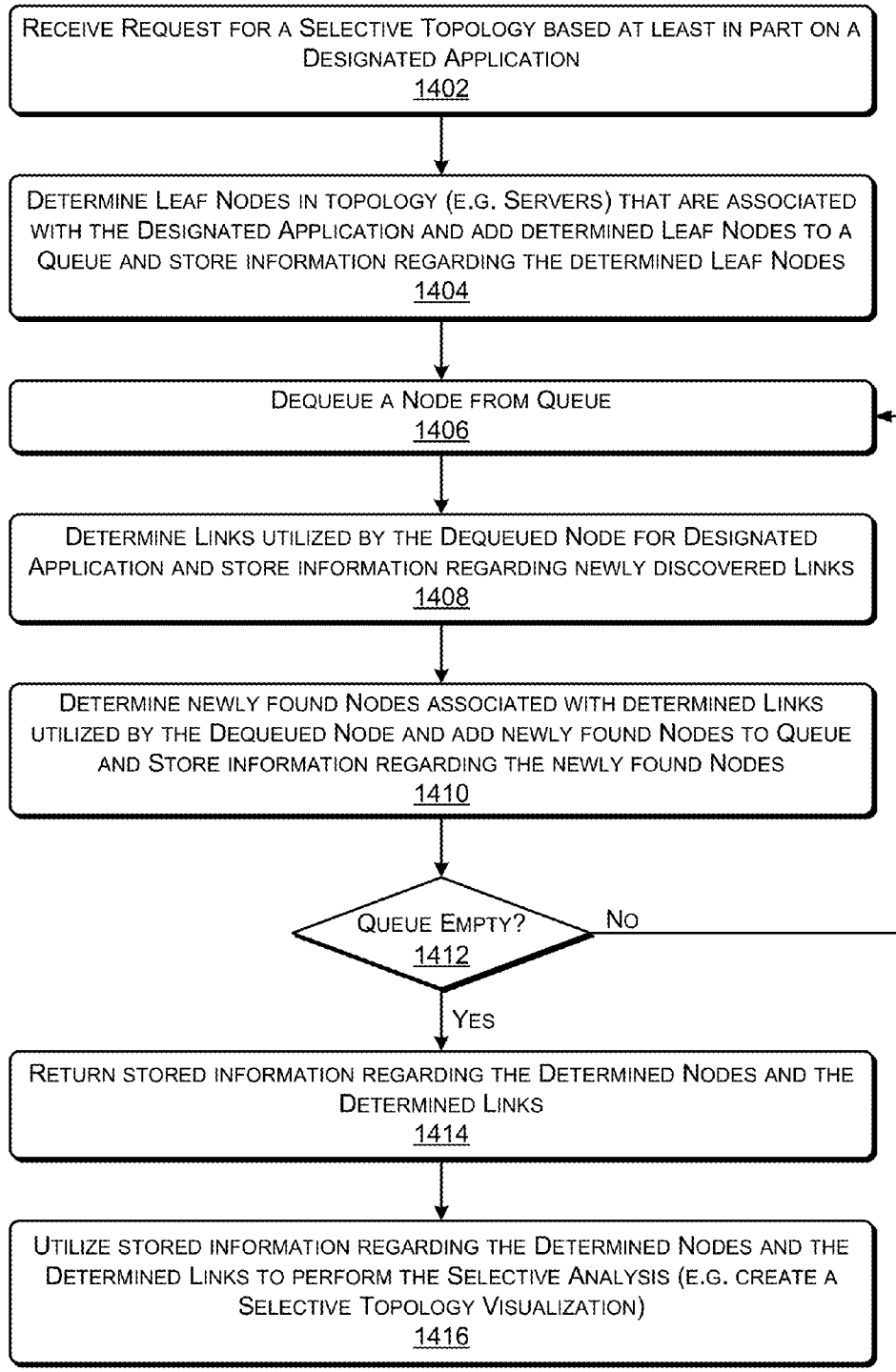
FIG. 14 illustrates an example process flow according to some implementations by which a visualization module may operate to create a visualization of a selective topology analysis for a given topology (e.g., a selective topology visualization such as that shown in FIG. 12).

FIG. 14 illustrates an example process flow 1400 according to some implementations by which the visualization module 330 may operate to create a visualization of a selective topology analysis for a given topology (e.g., a selective topology visualization such as that shown in FIG. 12). Of course, implementations are not limited to the following analysis being performed by the visualization module 330. Rather, in some implementations, the selective topology analysis may be performed by, for example, the analysis module 324 or the integration module 326.

At 1402, the visualization module 330 receives a request for a selective topology analysis based at least in part on utilization by a designated application in a given topology. At 1404, the visualization module 330 determines leaf nodes in the topology (e.g., servers) that are associated with the designated application and adds the determined leaf nodes to a queue and stores information regarding the determined leaf nodes.

At 1406, the visualization module 330 dequeues a node from the queue of nodes associated with the designated application. At 1408, the visualization module 330 determines links utilized by the dequeued node for the designated application and stores information regarding newly discovered links. At 1410, the visualization module 330 determines newly found nodes associated with the determined links utilized by the dequeued node for the designated application and adds the newly found nodes to the queue of nodes associated with the designated application and stores information regarding the newly found nodes.

At 1412, the visualization module 330 determines if the queue of nodes associated with the designated application is empty. If not, the process flow 1400 returns to 1406. If the queue is empty, the process flow 1400 moves to 1414.

At 1414, the visualization module 330 returns the stored information regarding the determined nodes and the determined links that are associated with the designated application. At 1416, the visualization module 330 utilizes the returned information regarding the determined nodes and the determined links associated with the designated application to perform the selective topology analysis (e.g., create a selective topology visualization).

Of course, while the process flow 1400 is discussed above with respect to a designated application being used as a filter for the selective analysis, implementations are not so limited. Such filter items may include designations of one or more of data center, device type, or any other property or hierarchical quality that may be used to differentiate between devices and/or links.

Figure 15:
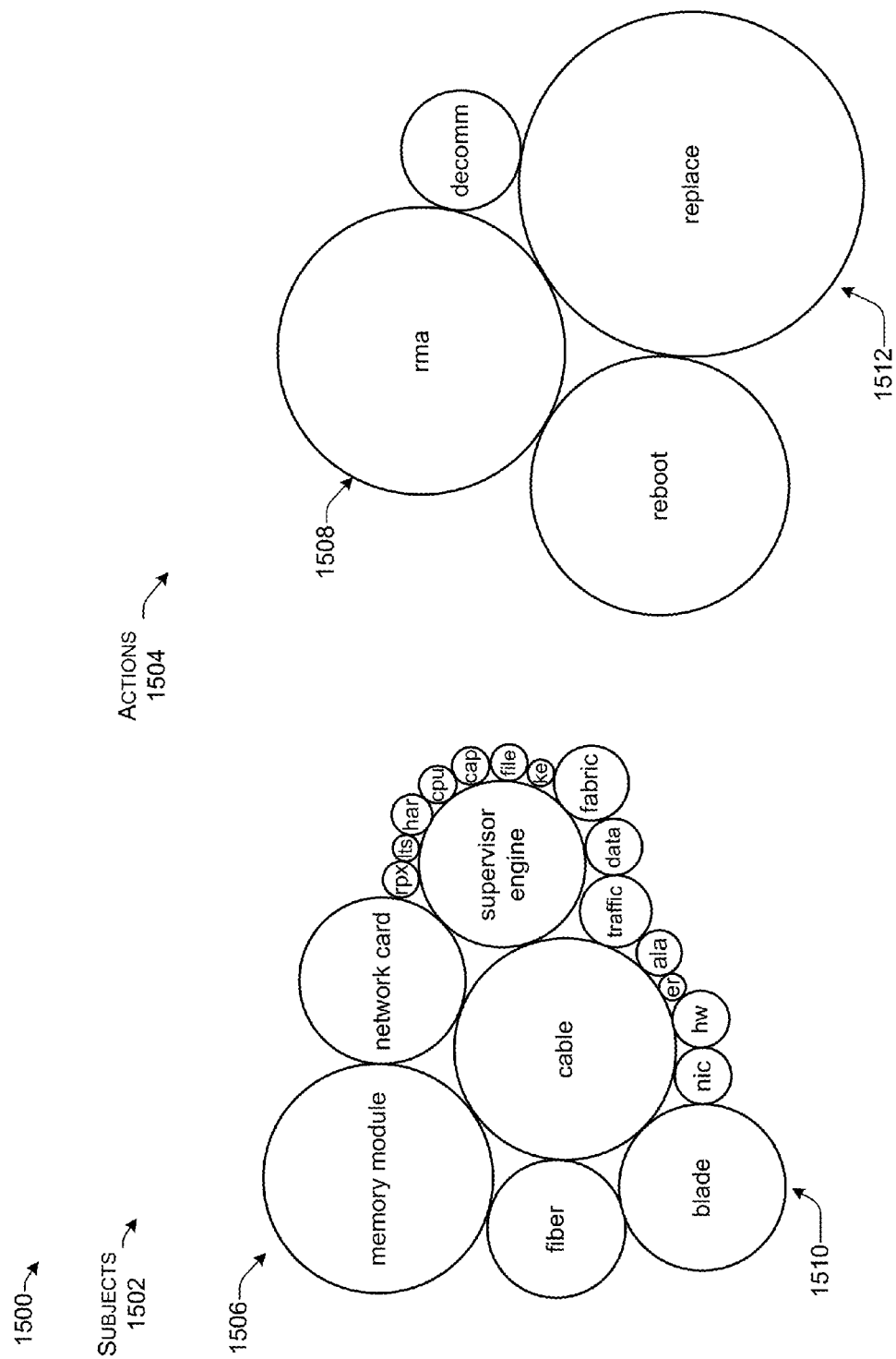
FIG. 15 illustrates an example visualization that may be generated by a graph/chart rendering module of a visualization module.

FIG. 15 illustrates an example visualization 1500 that may be generated by the graph/chart rendering module 910 of the visualization module 330. In particular, FIG. 13 illustrates an example type of root cause visualization 1500 that may illustrate the relative prevalence of subjects and actions taken on the subjects of the root causes (e.g., a failing device and the action taken to correct the failure). Specifically, the visualization includes "bubble charts" in which the size of a bubble indicates the relative prevalence of the corresponding item.

As illustrated in FIG. 15, the visualization includes two bubble charts. The first bubble chart illustrates subjects 1502. In FIG. 15, the subjects are the logical or physical items (e.g. entities) which failed. The second bubble chart illustrates actions 1504 performed on the logical or physical items. In FIG. 15, the actions 1504 are actions taken with respect to the subjects 1502 to correct the failure. For example, two example subject/action pairs are (memory module 1506, rma 1508) and (blade 1510, replace 1512). Such pairings would translate into RMAing the memory module and replacing the blade, respectively. It should be noted that, unlike the tree structure shown in FIG. 12, all possible pairings in the bubble chart may or may not have actually occurred. In other words, a memory module 1506 may or may not have been "RMAed." Rather, the visualization 1500 shows the relative prevalence of subjects 1502 and actions 1504. Such side by side viewing does not convey that all such pairings occurred. Further, as noted above, the size of the bubble indicates the relative prevalence of the item corresponding to the bubble. As such, based on the relative sizes, more memory modules 1506 were involved in failures than blades 1510 and more subjects 1502 were replaced 1512 than RMAed 1508.

While several example visualizations have been illustrated, implementations are not limited to those shown. For example, another example type of visualization and presentation of the visualization may be utilized to compare and contrast between two topologies (e.g. two data centers). Other visualizations may allow for visual comparisons of the results for a same or different analysis of based on two sets of parameters or filters (e.g. data centers, device types, properties, etc.).

While several examples have been illustrated herein for discussion purposes, numerous other configurations may be used and thus implementations herein are not limited to any particular configuration or arrangement. For example, the discussion herein refers to certain example network protocols and/or applications such as SMARTs, Cricket, MSN-CONF, NOC Trouble Ticketing and so on that may be used to collect network data. This should not be taken as a limitation as any network protocols and/or applications may be utilized for such a purpose. For example, instead of SMARTS, another network events/alarms/alerts monitoring system may be used in a similar fashion in some implementations. Further, while the discussion herein has been in the context of particular types of network data, some implementations may relate to other types of network data or other types of data in general, such as in application data. Some examples types of data that may be leveraged in some implementations include application-level alerts from servers, TCP errors, HTTP errors and so on.

Moreover, while some of the implementations discussed herein query a database of collected information based on a one-time query, some implementations may include continuous or standing queries that continuously run and process the dynamic data. When some specified condition on a set of query predicates holds true, the continuous queries may inform or alert the user or update the query result automatically (e.g., provide a materialized view in database systems). In such an implementation, visualization generated based on the materialized views may be updated to reflect changes in the updated query results. For example, in the context of a visualization of impactful network failures, if a network device which showed a failure previously returns to an active status, the visualization may be updated to remove the network device from the visualization of impactful network failures. Moreover, some implementations may provide for caching of query results and reuse of computation or analyses performed earlier by the hierarchical analytics system.

Additionally, in some implementations the queried data may be subjected to additional and/or other operations from those discussed above. For example, the queried data may be projected into individual dimensions and relations which can be rendered, and/or different types of processing operations such as aggregation and ordering may be performed on the queried data.

For example, a query for impactful network failures may have an output comprising multiple fields such as time of failure, device name, type of failure, datacenter, property, performance counters and network topology. To digest this data, a user-defined or application-defined criteria may be defined to show the event as <device name, traffic loss, redundancy effectiveness, topology level> which projects the query result to individual dimensions (e.g., device name) or relations of data (e.g., traffic loss as measured as sum of a function applied to traffic on individual links on that device). The additional or different types of processing may include any mathematical function on the queried data including the data operators of a database system including aggregation functions. Aggregation functions may combine data objects into a summary form (e.g., a SUM, COUNT). In some implementations, the additional processing may combine, correlate and/or aggregate the information across multiple queries to produce an output.

Further, the discussion herein refers to data being sent and received by particular components or modules of a system. This should not be taken as a limitation as such communication need not be direct and the particular components or modules need not necessarily be single functional units. The communications could instead be relayed by a separate module upon receipt of the communication. Further, the components and/or modules may be combined or the functionality may be separated amongst modules in various manners not limited to those discussed above.

Other variations in the logical and practical structure and framework of various implementations would be apparent to one of ordinary skill in the art in view of the disclosure provided herein.

Further, the processes described herein are only examples provided for discussion purposes. Numerous other variations will be apparent to those of skill in the art in light of the disclosure herein. Further, while the disclosure herein sets forth several examples of suitable frameworks, architectures and environments for executing the techniques and processes herein, implementations herein are not limited to the particular examples shown and discussed.

Furthermore, this disclosure provides various example implementations, as described and as illustrated in the drawings. However, this disclosure is not limited to the implementations described and illustrated herein, but can extend to other implementations, as would be known or as would become known to those skilled in the art in view of this disclosure. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

What is claimed is:

1. A computing system comprising:
   one or more processors;
   memory; and
   one or more hierarchical analytics modules stored in the memory and executable by the one or more processors to:
   perform data queries on one or more networks to obtain network data, the network data including traffic flow data including:
   traffic across links or devices of the one or more networks during an impact event, and
   a ratio of median traffic across the links or the devices during the impact event to traffic across the links or the devices during a time prior to the impact event;
   receive a filter item identifying or relating to one or more of a location, a topology level, a device type, a data center, an application or a service;
   filter the network data based at least in part on the filter item;
   perform a first set of analyses on the network data to produce first results representing probable symptoms of the one or more networks, wherein the first set of analyses are performed based at least in part on the filtering, the first set of analyses including:
   determining, based at least in part on a performance of the one or more networks after the impact event, an impact of the impact event on the links or the devices; and
   determining which of the links or the devices are associated with trouble tickets and/or failures, the first results corresponding to the links or the devices having a greatest number of the trouble tickets and/or a greatest number of the failures;
   perform a second set of analyses on the first results to produce second results, the second results representing troubleshooting operations for the probable symptoms, the second set of analyses including determining a probability that the links or the devices will fail within a predetermined time after the impact event; and
   sort, based at least in part on the second set of analyses, the second results.

2. The computing system of claim 1, wherein:
   the network data includes a first type of network data and a second type of network data;
   the first type of network data including alarm data, event data, security alerts, and trouble ticketing data; and
   the second type of network data including different alarm, event, security alerts, and trouble ticketing data.

3. The computing system of claim 1, wherein the first set of analyses further includes:
   generating information related to availability of the links or the devices associated with the network data.

4. A method comprising:
   performing data queries to obtain network data of a network, the network data including:
   traffic across links or devices of the network during an impact event, and
   a ratio of median traffic across the links or the devices during the impact event to traffic across the links or the devices during a time prior to the impact event;

receiving a filter item identifying or relating to one or more of a location, a topology level, a device type, a data center, an application or a service;

filtering the network data based at least in part on the filter item;

performing a first set of analyses on the network data to produce first results representing probable symptoms of the network, wherein the first set of analyses are performed based at least in part on the filtering, wherein the first set of analyses includes:

determining, based at least in part on a performance of the networks after the impact event, an impact of the impact event on the links or the devices; and determining which of the links or the devices are associated with trouble tickets and/or failures, the first results corresponding to the links or the devices having a greatest number of the trouble tickets and/or a greatest number of the failures;

performing a second set of analyses on the first results to produce second results, the second results representing troubleshooting operations for the probable symptoms, the second set of analyses including determining a probability that the links or the devices will fail within a predetermined time after the impact event; and filtering, based at least in part on the second set of analyses, the second results.

5. The method of claim 4, wherein the data queries query one or more sources to obtain the network data.

6. The method of claim 4, further comprising:
exposing an application programming interface (API) to at least the data queries, the first set of analyses, or the second set of analyses.

7. The method of claim 4, further comprising:
exposing an application programming interface (API) to at least the data queries and the first set of analyses.

8. The method of claim 7, wherein the first set of analyses obtain the results of the data queries by calling the APIs of the data queries.

9. The method of claim 4, further comprising:
generating one or more visualizations based at least in part on the first results.

10. The method of claim 4, wherein the first set of analyses further includes:
identifying one or more first devices associated with a particular application or service;
identifying one or more second devices associated with the one or more first devices based at least in part on the one or more second devices having communicated with the one or more first devices over a link associated with the particular application or service;
identifying one or more third devices associated with the one or more second devices based at least in part on the one or more third devices having communicated with the one or more second devices over the link associated with the particular application or service; and
determining that the one or more first devices, the one or more second devices, and the one or more third devices are a device subset associated with the particular application or service.

11. The method of claim 4, further comprising:
providing an interface to access one or more of the data queries, the first set of analyses, or the second set of analyses, the interface being organized based at least in part on one or more of a location, a time, types of processing, types of functionality, or types of events.

12. The method of claim 4, further comprising determining, by utilizing at least one of the first set of analyses or the second set of analyses, an amount of server hardware resources required to provide a desired level of service for a given cost.

13. The method of claim 4, further comprising:
automatically initiating one or more of the troubleshooting operations for the probable symptoms.

14. The method of claim 4, wherein the second set of analyses further includes:
determining a utilization trend to determine a capacity of the links or the devices.

15. One or more computer storage media storing instructions that, when executed by one or more processors of a computing system, cause the one or more processors to perform acts of one or more hierarchical analytics modules, the one or more hierarchical analytics modules executable by the one or more processors to:

receive a query to obtain network data, the network data including:
traffic across links or devices of one or more networks during an impact event, and
a ratio of median traffic across the links or the devices during the impact event to traffic across the links or the devices during a time prior to the impact event;

receive a filter item identifying or relating to one or more of a location, a topology level, a device type, a data center, an application or a service;

filter the network data based at least in part on the filter item;

receive a first request for the one or more hierarchical analytics modules to perform a first set of analyses on the network data, wherein the first set of analyses are performed based at least in part on the filtered network data, the first set of analyses including:
determining, based at least in part on a performance of the one or more networks after the impact event, an impact of the impact event on individual links or devices; and
determining which of the links or the devices are associated with trouble tickets and/or failures;

determine first results of the first set of analyses, the first results including probable symptoms corresponding to:
the links or the devices having a greatest number of the trouble tickets and/or a greatest number of the failures;

receive a second request for the one or more hierarchical analytics modules to perform a second set of analyses on the first results, the second set of analyses including determining a probability that the links or the devices will fail within a predetermined time after the impact event; and determine second results of the second set of analyses, the second results representing one or more troubleshooting operations for the probable symptoms; and suggest a troubleshooting operation for one or more of the probable symptoms.

16. The one or more computer storage media of claim 15, wherein the one or more hierarchical analytics modules are further executable by the one or more processors to:
generate based at least in part on the first results or the second results, one or more visualizations.

17. The one or more computer storage media of claim 16, wherein a selective topology visualization of the one or more visualizations is a topology graph comprising:
a plurality of nodes, each node representing a device of a plurality of devices in a network topology;

a plurality of edges, each edge representing a link of a plurality of links between the plurality of devices in the network topology; and wherein the selective topology visualization differentiates nodes of the plurality of nodes and edges of the plurality of edges representing first devices and first links matching the filter item from nodes and edges representing second devices and second links not matching the filter item or the selective topology visualization does not include nodes and edges representing the second devices and the second links not matching the filter item.

18. The one or more computer storage media of claim 17, wherein:

the filter item identifies the application or the service operated on at least a subset of the plurality of devices in the network topology; and the first devices matching the filter item are associated with the application or the service and the first links matching the filter item are between the first devices utilized for network traffic associated with the application or the service.

19. The one or more computer storage media of claim 15, wherein the one or more hierarchical analytics modules are further executable by the one or more processors to automatically update the first results based at least in part on a change in the network data.

\* \* \* \* \*